US008178992B1

(12) United States Patent
Meller

(10) Patent No.: US 8,178,992 B1
(45) Date of Patent: May 15, 2012

(54) AXIAL FLUX ALTERNATOR WITH AIR GAP MAINTAINING ARRANGEMENT

(76) Inventor: Moshe Meller, Tel Aviv (IL)

( * ) Notice: Subject to any disclaimer, the term of this patent is extended or adjusted under 35 U.S.C. 154(b) by 0 days.

(21) Appl. No.: 13/217,475

(22) Filed: Aug. 25, 2011

Related U.S. Application Data

(63) Continuation-in-part of application No. 12/980,589, filed on Dec. 29, 2010, now Pat. No. 8,026,626.

(60) Provisional application No. 61/416,439, filed on Nov. 23, 2010, provisional application No. 61/450,834, filed on Mar. 9, 2011, provisional application No. 61/452,277, filed on Mar. 14, 2011, provisional application No. 61/452,858, filed on Mar. 15, 2011.

(51) Int. Cl.
*H02P 9/00* (2006.01)
*F03D 9/00* (2006.01)

(52) U.S. Cl. .......................................... 290/55; 310/268

(58) Field of Classification Search .................... 290/55; 310/268
See application file for complete search history.

(56) References Cited

U.S. PATENT DOCUMENTS

| | | | |
|---|---|---|---|
| 2,153,523 | A | 4/1939 | Roberts et al. |
| 2,388,377 | A | 11/1945 | Albers |
| 3,699,372 | A | 10/1972 | Abe et al. |
| 4,039,848 | A | 8/1977 | Winderl |
| 4,073,516 | A | 2/1978 | Kling |
| 4,084,102 | A | 4/1978 | Fry et al. |
| 4,165,468 | A | 8/1979 | Fry et al. |
| 4,166,569 | A | 9/1979 | Begnaud et al. |
| 4,166,596 | A | 9/1979 | Mouton, Jr. et al. |
| 4,213,057 | A | 7/1980 | Are |
| 4,219,303 | A | 8/1980 | Mouton, Jr. et al. |
| 4,285,481 | A | 8/1981 | Biscomb |
| 4,309,006 | A | 1/1982 | Biscomb |
| 4,345,161 | A | 8/1982 | Crompton |
| 4,350,898 | A | 9/1982 | Benoit |
| 4,350,899 | A | 9/1982 | Benoit |
| 4,358,243 | A | 11/1982 | Heath |
| 4,383,182 | A | 5/1983 | Bowley |
| 4,450,364 | A | 5/1984 | Benoit |

(Continued)

FOREIGN PATENT DOCUMENTS

JP 57-070964 A 5/1982

(Continued)

OTHER PUBLICATIONS

U.S. Appl. No. 12/779,475, filed May 13, 2010; Title: "Wind Turbines Direct Drive Alternator System With Torque Balancing"; Inventor: Moshe Meller.

*Primary Examiner* — Joseph Waks
(74) *Attorney, Agent, or Firm* — Holtz, Holtz, Goodman & Chick, P.C.

(57) ABSTRACT

Axial flux alternator for a wind turbine arrangement includes at least one magnetic disk including magnets and at least one coil disk including electromagnetic assemblies. One or both disks are mounted to wind turbines such that adjacent disks rotate in opposite directions, or such that the magnets of a magnetic disk move relative to the electromagnetic assemblies of an adjacent coil disk which may move or be stationary, or vice versa. Between adjacent disks, rolling elements on one disk roll, slide or move on or against the surface of the opposite disk in order to fix and maintain air gaps between the magnets on a magnetic disk and magnetic cores of the electromagnetic assemblies on the coil disk, and thus enable continued motion and use of the alternator.

20 Claims, 16 Drawing Sheets

U.S. PATENT DOCUMENTS

| | | | |
|---|---|---|---|
| 4,470,563 | A | 9/1984 | Engelsman |
| 4,491,739 | A | 1/1985 | Watson |
| 4,495,423 | A | 1/1985 | Rogers |
| 4,547,124 | A | 10/1985 | Kliatzkin et al. |
| 4,572,962 | A | 2/1986 | Shepard |
| 4,997,414 | A | 3/1991 | Camara et al. |
| 5,040,948 | A | 8/1991 | Harburg |
| 5,062,765 | A | 11/1991 | McConachy |
| 5,079,461 | A | 1/1992 | Schluter et al. |
| 5,334,899 | A | 8/1994 | Skybyk |
| 5,506,453 | A | 4/1996 | McCombs |
| 5,798,632 | A | 8/1998 | Muljadi |
| 6,002,193 | A | 12/1999 | Canini et al. |
| 6,091,161 | A | 7/2000 | Dehlsen et al. |
| 6,127,739 | A | 10/2000 | Appa |
| 6,278,197 | B1 | 8/2001 | Appa |
| 6,285,090 | B1 | 9/2001 | Brutsaert et al. |
| 6,476,513 | B1 | 11/2002 | Gueorguiev |
| 6,492,743 | B1 | 12/2002 | Appa |
| 6,710,489 | B1 | 3/2004 | Gabrys |
| 6,781,254 | B2 | 8/2004 | Roberts |
| 6,945,747 | B1 | 9/2005 | Miller |
| 6,975,045 | B2 | 12/2005 | Kurachi et al. |
| 7,129,596 | B2 | 10/2006 | Macedo |
| 7,183,663 | B2 | 2/2007 | Roberts et al. |
| 7,190,101 | B2 | 3/2007 | Hirzel |
| 7,309,930 | B2 | 12/2007 | Suryanarayanan et al. |
| 7,317,261 | B2 | 1/2008 | Rolt |
| 7,335,000 | B2 | 2/2008 | Ferguson |
| 7,384,239 | B2 | 6/2008 | Wacinski |
| 7,402,934 | B1 | 7/2008 | Gabrys |
| 7,489,046 | B2 | 2/2009 | Costin |
| 7,582,981 | B1 | 9/2009 | Meller |
| 7,679,249 | B2 | 3/2010 | Appa et al. |
| 7,709,973 | B2 | 5/2010 | Meller |
| 7,723,861 | B2 | 5/2010 | Meller |
| 7,821,149 | B2 | 10/2010 | Meller |
| 7,830,033 | B2 | 11/2010 | Meller |
| 7,888,839 | B2 | 2/2011 | Gabrys |
| 7,923,854 | B1 | 4/2011 | Meller |
| 8,026,626 | B1 | 9/2011 | Meller |
| 2003/0111925 | A1 | 6/2003 | Strohm |
| 2004/0096327 | A1 | 5/2004 | Appa et al. |
| 2007/0228738 | A1 | 10/2007 | Wrage et al. |
| 2008/0023964 | A1 | 1/2008 | Sureshan |
| 2008/0048453 | A1 | 2/2008 | Amick |
| 2008/0296905 | A1 | 12/2008 | Ferguson |
| 2009/0152391 | A1 | 6/2009 | McWhirk |
| 2010/0032947 | A1 | 2/2010 | Bevirt |
| 2010/0032948 | A1 | 2/2010 | Bevirt |
| 2010/0032949 | A1 | 2/2010 | Varrichio et al. |
| 2010/0111697 | A1 | 5/2010 | Wood |
| 2010/0283252 | A1 | 11/2010 | Fradella |
| 2011/0140451 | A1 | 6/2011 | Sharples et al. |

FOREIGN PATENT DOCUMENTS

| | | | |
|---|---|---|---|
| JP | 2-161173 | A | 6/1990 |
| WO | WO 2007/051034 | A2 | 5/2007 |

AXIAL FLUX ALTERNATOR WITH AIR GAP MAINTAINING ARRANGEMENT

CROSS REFERENCE TO RELATED APPLICATIONS

This application is a continuation-in-part of U.S. patent application Ser. No. 12/980,589 filed Dec. 29, 2010 now U.S. Pat. No. 8,026,626, and claims priority under 35 U.S.C. §119 (e) of U.S. provisional patent application Ser. Nos. 61/416,439 filed Nov. 23, 2010, 61/450,834 filed Mar. 9, 2011, 61/452,277 filed Mar. 14, 2011, and 61/452,858 filed Mar. 15, 2011, all of which are incorporated by reference herein.

FIELD OF THE INVENTION

The present invention relates to axial flux type alternators for wind turbine arrangements that include magnets and coils that must be spaced apart from one another by an air gap to maintain functionality of the wind turbine alternator. The present invention also relates to a method for providing for and maintaining functionality or operability of a wind turbine arrangement including an axial flux type alternator.

BACKGROUND OF THE INVENTION

The challenges of global climate change and energy security demands have made the development of renewable energy alternatives vital for our future. Globally, wind turbines account for only about two percent of electricity generated—but it is clear that this fraction needs to grow in order to break the chains of petroleum dependency.

In order to produce electricity from a wind turbine, rotation of the wind turbines is transferred to an alternator, typically directly or through a transmission gear system. The alternator outputs an electromagnetic force (hereinafter "EMF") that is proportional to the revolutions per minute (hereinafter "RPM") of the alternator and to the strength of a magnetic field generated by relative movement of magnets to electromagnetic assemblies including coils wound around magnetic cores.

The need to capture more wind power, i.e., improve the conversion of the rotation of the wind turbine into electrical energy, is leading to an increase in the span of the turbine blades of the wind turbine. This, in turn, leads to lower RPM of the wind turbine. Consequently, a conventional wind turbine includes a transmission gear section or gearbox that increases the RPM of the alternator. Some of the main disadvantages of this type of transmission gear section or gearbox include: energy losses, lower overall efficiency, and higher weight and maintenance.

Reliability issues with wind turbine gearboxes are known to exist and stem, for example, from the extreme engineering challenges that gearbox technology faces in wind applications. In order to reduce failure and downtime, the industry is shifting toward direct drive generator technology that eliminates the need for a gearbox.

Thus, a wind turbine without a transmission gear section is often referred to as a direct drive wind turbine. A direct drive wind turbine alternator has a larger diameter, and there are two primary types of such alternators, a radial flux type and an axial flux type.

The present invention relates to axial flux alternators that usually include magnets and electromagnetic assemblies that move relative to one another and have an air gap therebetween. Constructing the alternator to provide a desired dimension for the air gap between the magnets and the coils of an axial flux alternator, also referred to herein as adjusting the air gap, and maintaining the air gap during operation of the wind turbine, is a technical challenge, particularly for a large diameter axial flux alternator.

Another issue of concern for wind turbines is that large wind turbine span leads to a lower RPM's. In order to achieve high frequency with low RPM's, a large diameter direct drive generator is required. Consequently, direct drive generators are very heavy. For example, the direct-drive generator used in Enercon's 6 MW turbine weighs about 450 tons. At such weights, problems rapidly develop with transportation and installation, particularly with the availability of lifting ships capable of deploying such weights in an offshore environment. This, in turn, can lead to dramatic increases in offshore wind project installation costs as well as the overall cost effectiveness of such a project.

Furthermore, in order to achieve sufficient frequency with low RPM's, a relatively large number of magnets is required. As a result, the magnetic attraction forces between the large number of installed magnets and a correspondingly large number of coil-wound magnetic cores creates high resistance to rotation. For projects located far from the grid connection point, or of several hundred megawatts in capacity, AC transmission becomes costly or impossible, due to cable-generated reactive power using up much of the transmission capacity. In such cases, high voltage DC (HVDC) transmission is becoming a viable option. While voltage-source high voltage DC transmission is a relatively new commercial technology, as most future offshore wind farms will be large and/or located far from shore, HVDC is expected to be widely used going forward.

Still another issue of concern for direct drive generators is that they are expected to reduce down time and maintenance cost. However, as direct drive permanent magnet generators typically comprise neodymium-iron-boron elements, there are major concerns over how rare earth minerals could limit the development of direct drive wind turbine technologies. The vast majority of rare earth metals is being produced in China, of which about 43.5% of the world's supply comes from a single mine in the town of Bayan Obo in Baotou. For the sixth consecutive year, the Chinese Ministry of Industry and Information Technology has trimmed output quotas of rare earth metals, making the resource scarce and expensive. Consequently, minimizing the rare earth magnets used per each megawatt generated will not only significantly reduce transportation and installation costs due to lower weight but will also lead the direct drive wind turbine sector toward sustainable development and growth.

SUMMARY OF THE INVENTION

An axial flux alternator in accordance with one embodiment of the present invention includes at least one magnetic disk including magnets and at least one coil disk including electromagnetic assemblies. Adjacent disks are preferably mounted to rotate in opposite directions, or otherwise such that the magnets of a magnetic disk move relative to the electromagnetic assemblies of an adjacent coil disk, which may move or be stationary, or vice versa. Between the disks, there are rolling elements, such as bearings, that are fixed to one of the disks and that roll, slide or otherwise move on or against the surface of the other disk. Alternatively, the rolling elements may be thrust bearings that roll on or against the surfaces of both adjacent disks, or other similar types of bearings that may be situated between opposed surfaces of adjacent disks and roll on or against both of the opposed surfaces.

The dimensions or diameters of the rolling elements fix the distance between the rotating disks and thereby set and operationally maintain an air gap between the surfaces of the magnets in the magnetic disk and the surfaces of the magnetic cores of the electromagnetic assemblies of the coil disk. Maintaining this air gap prevents the magnets on the magnetic disk from coming into contact with the magnetic cores on the coil disk and thereby allowing continuous motion and use of the wind turbine arrangement including the alternator.

In a wind turbine arrangement in accordance with the invention, the coil disk may be coupled to one wind turbine and the magnetic disk to another wind turbine, with the wind turbines rotating in opposite directions to one another. Alternatively, but not in preferred embodiments, the coil disk is coupled to one wind turbine and the magnetic disk is fixed, or vice versa.

In any of the axial flux generator in accordance with the invention, the magnetic and/or coil disks may be constructed to enable them to be lightweight yet strong. Specifically, ultra light and strong large diameter magnetic and coil disks for axial flux generators each include thin outer layers of strong, rigid materials and a thicker inner layer or core of airy lightweight core materials. While the outer layers and inner layer of the magnetic disks can be constructed from conductive materials, the outer layers and inner layer of the coil disks must be constructed from non-conductive materials. Supporting elements can be placed within the inner layers to strengthen the disks.

Another embodiment of an axial flux generator in accordance with the present invention comprises a large number of magnets arranged in rows on the magnetic disk(s), with each magnetic row being separated from adjacent magnetic rows by constant angular distance, and a large number of electromagnetic coil bobbins arranged on the coil disk, with each coil bobbin including a magnetic core and a conductive coil wound around it. Each coil bobbin is separated from adjacent coil bobbins by a constant angular distance. The coil disk and the magnetic disk(s) face each other. There is a strong magnetic attraction between the magnets and the magnetic cores in the coil bobbins. If all magnets and magnetic cores are at maximum magnetic attraction at certain angular positions, locking forces would be induced on the magnetic disks and the coil disk which would make the relative rotational motion between the generator disks impossible. To avoid this situation, in this embodiment of the axial flux generator, the angular distances between the magnetic rows on the magnetic disk(s) and the coil bobbins on the coil disk is designed so that only a small portion of the magnets and the coil bobbins can be at maximum magnetic attraction in certain angular position. This design allows smooth rotational motion between the magnetic disks and the coil disks and the large number of electrically autonomous coil bobbins to be electrically connected so that the output of the generator can be high voltage DC.

In another embodiment of an axial flux generator in accordance with the invention, with one or more coil disks and one or more magnetic disks arranged as described above, electrically autonomous electromagnetic coil bobbins are arranged on one coil disk. From both sides, the coil bobbins face rows of magnets, i.e., magnetic rows, arranged on any adjacent magnetic disks. By virtue of a novel arrangement of the magnetic rows and steel base plates for the magnets, a high intensity changeable magnetic flux through the magnetic cores of the coil bobbins is provided. Once the magnetic and coil disks are in relative rotational motion, electrical power is generated.

BRIEF DESCRIPTION OF THE DRAWINGS

The invention, together with objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
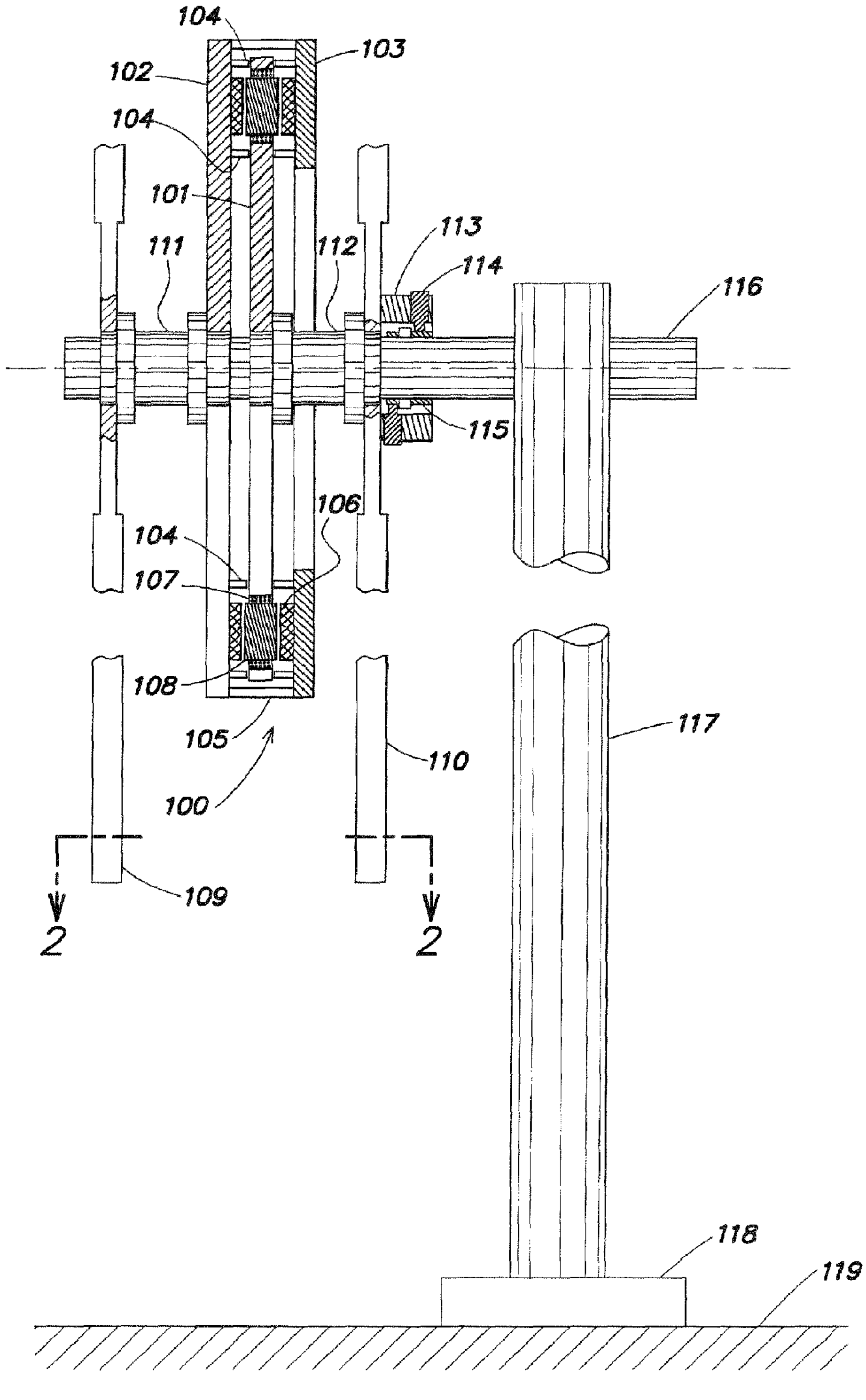
FIG. 1 is a side view, partial cross section of wind turbine arrangement with an alternator in accordance with the present invention.

Referring to the accompanying drawings wherein like reference numerals refer to the same or similar elements, FIG. 1 shows a wind turbine arrangement including an axial flux alternator in accordance with the invention, designated generally as 100. As used herein, the term “alternator” is synonymous with and used interchangeably with a “generator”. The alternator 100, or alternator section, includes three disks, a coil disk 101, a main or primary magnetic disk 102 and a secondary magnetic disk 103. Supporting elements 105 mechanically connect the secondary magnetic disk 103 to the primary magnetic disk 102. Supporting elements 105 may be a plurality of rigid members distributed over the circumference of the primary and secondary disks 102, 103. Although three disks 101, 102, 103 are shown in FIG. 1, one of which is a coil disk and the other two of which are magnetic disks, at a minimum, the alternator section 100 includes one magnetic disk and one coil disk, see FIG. 11 described below, and may also include any number of additional magnetic disks and/or coil disks with each magnetic disk being arranged opposite a coil disk, or vice versa. For example, an alternator section may include two coil disks and three magnetic disks, see FIG. 13 described below.

Figure 4A:
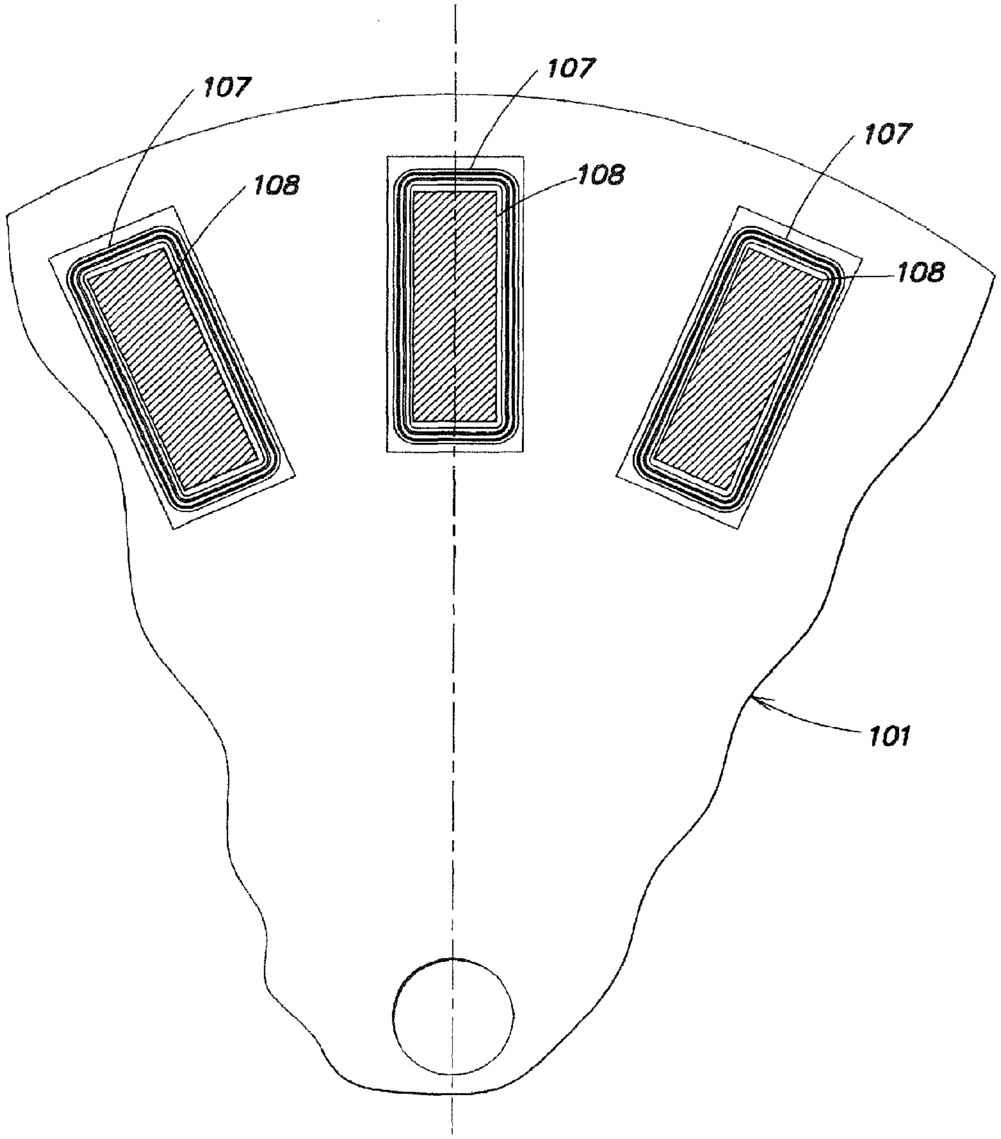
FIG. 4A shows one embodiment of the coil disk in the alternator in accordance with the present invention.
Figure 6:
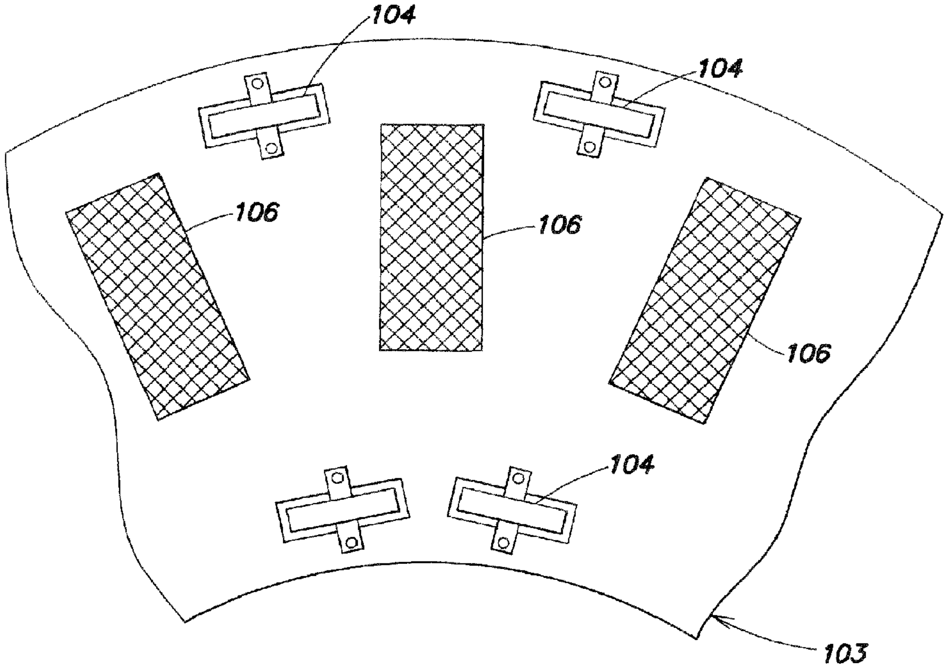
FIG. 6 shows the secondary magnetic disk in the alternator in accordance with the present invention.

Rolling elements 104 are assembled, manufactured or otherwise constructed and then fixed to the primary and secondary magnetic disks 102, 103 and roll on or against the opposing surfaces of the coil disk 101. Alternately, rolling elements 104 may be fixed to the coil disk 101 and roll on or against the opposing surfaces of the primary and secondary magnetic disks 102, 103. Rolling elements 104 are preferably ball bearings or cylinder bearings, but other rolling elements can be used in the invention. As shown, rolling elements 104 are situated both radially inward and radially outward of magnets 106, conductive coils 107 and magnetic cores 108. However, it is possible to position the rolling elements 104 only radially inward of the magnets 106, conductive coils 107 and magnetic cores 108 or only radially outward of the magnets 106, conductive coils 107 and magnetic cores 108. The presence of rolling elements 104 both radially inward and radially outward of the magnets 106, conductive coils 107 and magnetic cores 108 as illustrated in FIGS. 1, 4A and 6 is preferred.

Magnets 106 are mechanically connected to the primary and secondary magnetic disks 102 and 103 and are preferably rare earth magnets. Other types of magnets can be used. Magnets 106 may be arranged at a constant angular distance from one another or equiangularly.

conductive coils 107 are wound around the magnetic cores 108, e.g., one or more coils 107 around each magnetic core 108, to form electromagnetic assemblies. The magnetic cores 108 are preferably made from laminations of silicon steel, but other types of magnetic steel can be used. The electromagnetic assemblies of the coils 107 and magnetic cores 108 are connected to the coil disk 101.

Two sets of wind turbines 109, 110 are arranged about a common and stationary shaft 116 of the arrangement. Wind turbines 109, 110 may be constructed to rotate in opposite directions when exposed to the same wind, and this is preferred embodiment as it increases the relative angular velocity between the electromagnetic assemblies on the coil disk 101 and the magnets 106 on the primary and secondary disks 102, 103.

Bearing housings 111 and 112 mechanically connect the wind turbines 109 and 110 to the primary magnetic disk 102 and the coil disk 101, respectively. Bearing housings 111 and 112 enable rotation of the turbines 109, 110 and thus the coil disk 101 coupled to the wind turbine 110, and the primary and secondary magnetic disks 102, 103 coupled to the wind turbine 109, around the stationary shaft 116. Bearing housings 111 and 112 house or contain bearings, not showing in the drawings. One skilled in the art would be able to determine the size, type and construction of such bearings that are needed to enable rotation of the wind turbines 109, 110 relative to the stationary shaft 116.

A carbon brush assembly enables transmission of electricity generated by the rotational parts of the alternator section 100 to a stationary section of the wind turbine arrangement. The carbon brush assembly includes a carbon brush housing 113, carbon brushes 114 and stationary slippery rings 115 that transmit the electricity power from the carbon brushes 114 to the stationary section of the wind turbine arrangement. Electrical wiring and connections are not shown in FIG. 1.

The shaft 116 is supported on a main tower assembly 117 that is, in turn, supported by a base 118 resting on ground 119 or another supporting structure.

Figure 2:
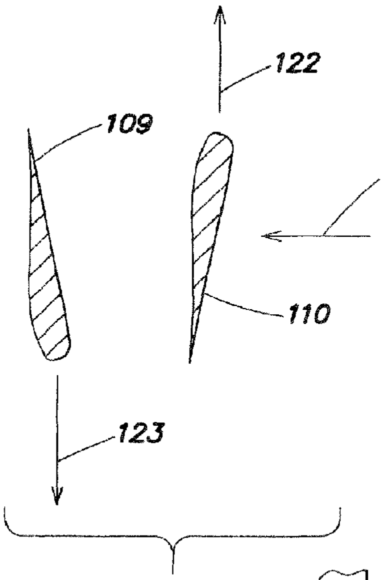
FIG. 2 is a cross section view of the wind turbine blades.

FIG. 2 shows the cross section of the turbine blades of the wind turbines 109 and 110 along line 2-2 in FIG. 1. When the blades of the wind turbines 109, 110 are exposed to the same wind, in the direction of arrow 121, they are Caused to rotate in opposite directions, i.e., wind turbine 109 in the direction of arrow 123 and wind turbine 110 in the direction of arrow 122. This difference in the rotation direction arises from the construction and formation of the profiles of the blades as shown in FIG. 2.

Figure 3:
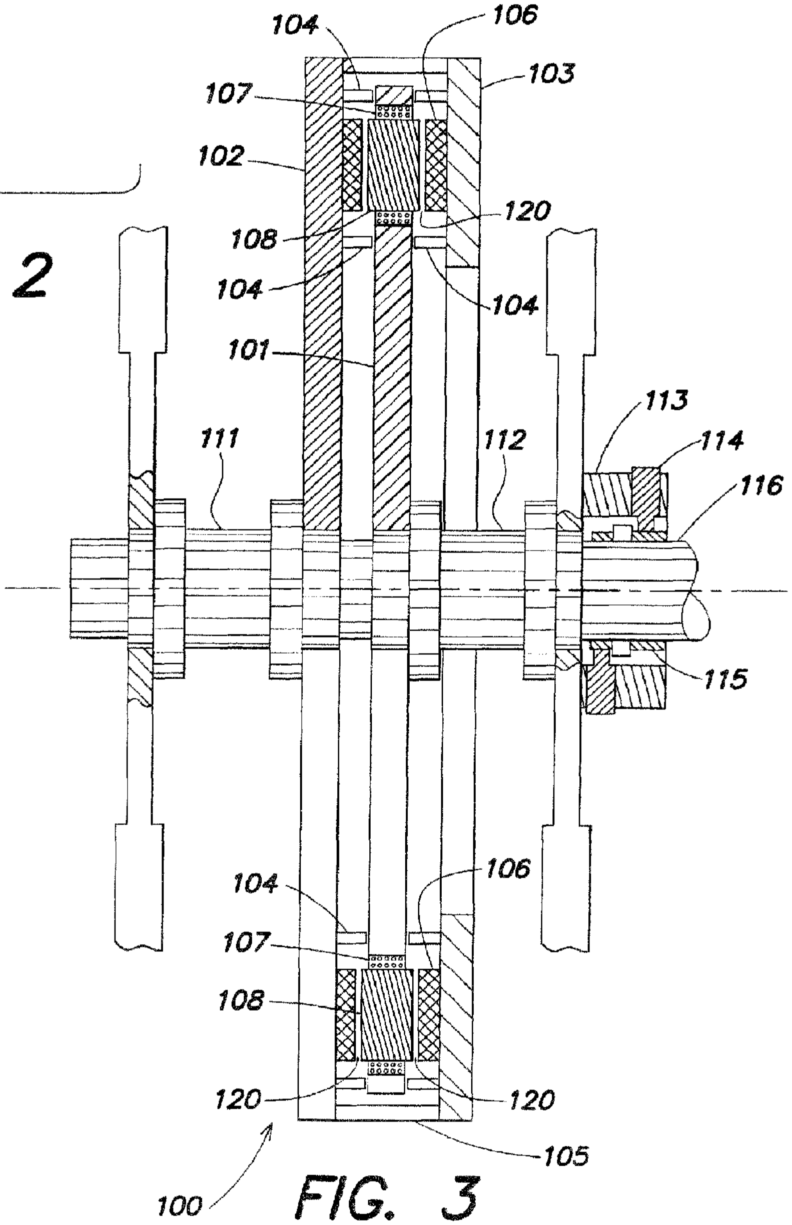
FIG. 3 is a detailed side view of the alternator in accordance with the present invention.

FIG. 3 shows greater details of the alternator section 100. Air gaps 120 can be seen in FIG. 3 between the surfaces of the magnets 106 and the surfaces of the magnetic cores 108. The size of the air gaps 120 are determined by the diameter of the rolling elements 104 and by the size of the supporting elements 105. Typical air gaps 120 that can be used are from about 1.5 mm to about 3.0 mm, although this range is not limiting and other sizes of air gaps can be used as well. A particular size air gap 120 that may be used is 2.0 mm.

Accordingly, once it is determined what size air gap 120 is desired, in consideration of EMF generated by the rotation of the wind turbines 109, 110 and/or other characteristics of the arrangement including the alternator section 100, such as the diameter of the wind turbines 109, 110 and the weight of the wind turbines 109, 110 and parts thereof, the rolling elements 104 are selected to provide this size air gap.

FIG. 4A shows a segment of the coil disk 101, i.e., a front or rear view. In one embodiment, the coil disk 101 is made from a sandwich of fiberglass and non-metallic honeycomb material, i.e., a composite material, and this composite provides a good ratio between strength and weight without being electricity conductive, which is important to avoid eddy currents. Other materials can be used without deviating from the scope and spirit of the invention.

Electromagnetic assemblies, i.e., the coils 107 wound around the magnetic cores 108, are arranged angularly on the outer portion of coil disk 101. The number of electromagnetic assemblies that can be used depends on, for example, the diameter of the coil disk 101. A larger number of electromagnetic assemblies will provide more power from a given size of coil disk 101. The surfaces of the magnetic cores 108 are exposed from both sides of the coil disk 101 to the magnets 106 on the primary and secondary magnetic disks 102, 103 so that the magnetic flux of two magnets 106 pass through the magnetic cores 108 simultaneously, thereby increasing the EMF of the alternator section 100.

Figure 4B:
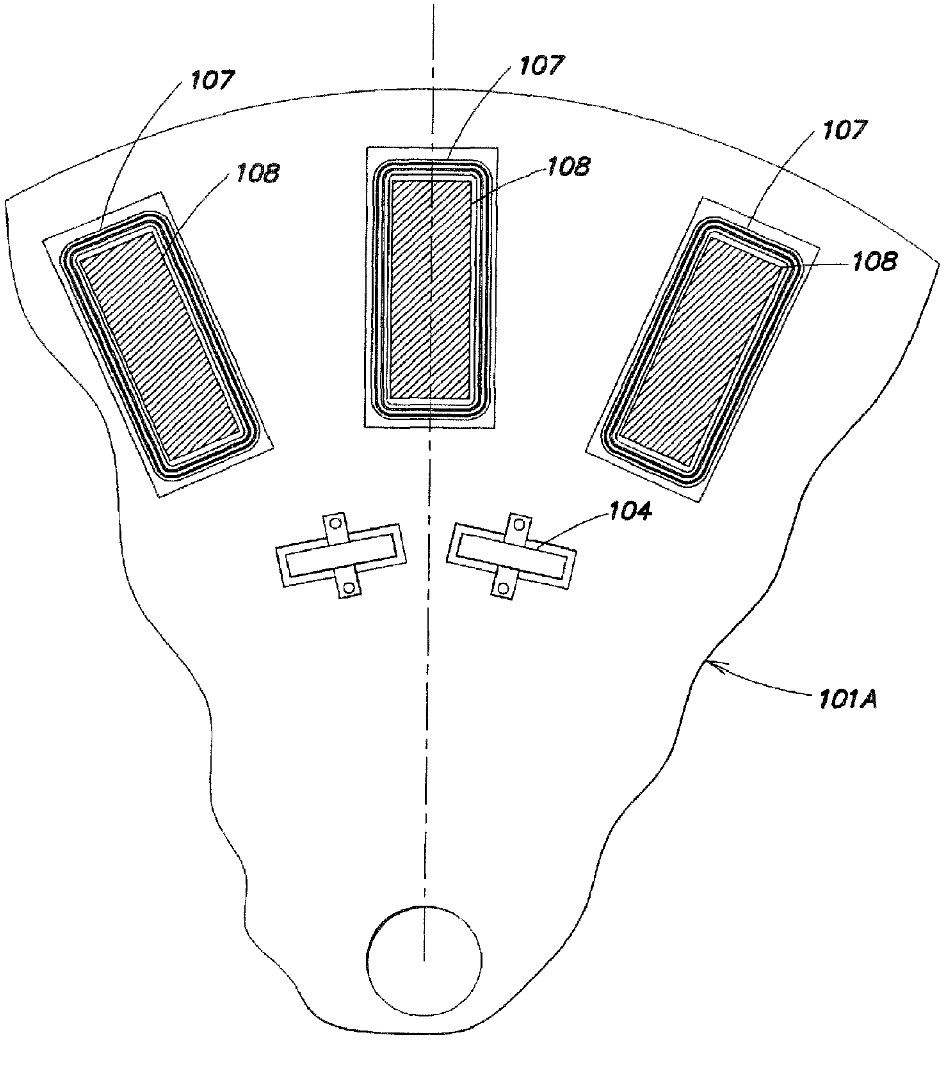
FIG. 4B shows another embodiment of the coil disk in the alternator in accordance with the present invention.

FIG. 4B shows an embodiment wherein the coil disk 101A includes rolling elements 104 arranged in a ring radially inward of the electromagnetic assemblies. Rolling elements 104 may alternatively or additionally be arranged in a ring radially outward of the electromagnetic assemblies.

Figure 5:
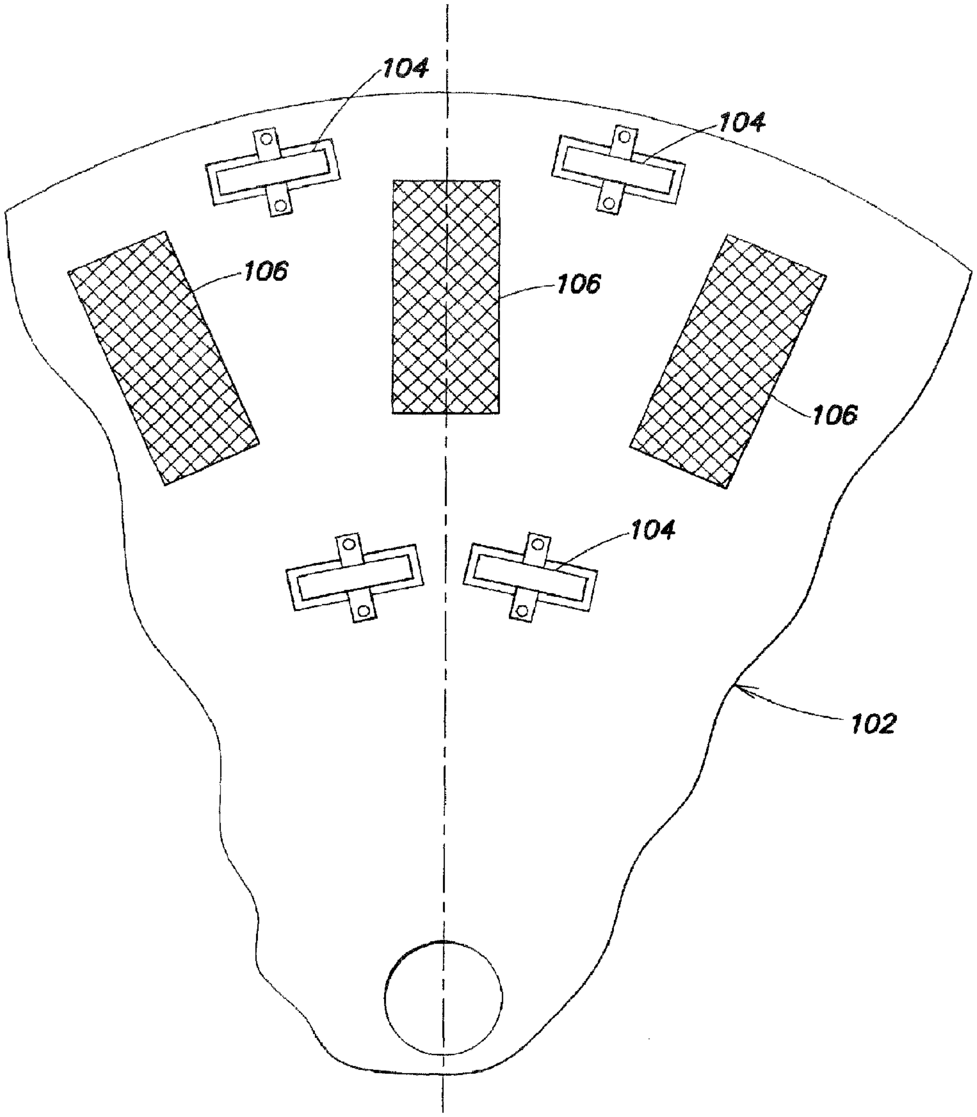
FIG. 5 shows the main magnetic disk in the alternator in accordance with the present invention.

FIG. 5 shows a segment of the primary magnetic disk 102, i.e., a front or rear view. The primary magnetic disk 102 may be made from a sandwich of carbon fiber and honeycomb material, i.e., a composite material, and this composite material provides a very good strength to weigh ratio. Other materials can be used without deviating from the scope and spirit of the invention.

Magnets 106 are arranged on the outer portion of the coil disk 101 and the rolling, elements 104 are arranged in an outer ring, radially outward of the magnets 106, and in an inner ring, radially inward of the magnets 106. It is advantageous, but not essential, that the magnets 106 are supported from both sides by rolling elements 104 in order to balance the strong attraction force between the magnets 106 and the magnetic cores 108. Rolling elements 104 may be placed in, for example, rectangular or square holes in the coil disk 101 as shown in FIG. 4A, which holes allow the rolling elements 104 to rotate and to be supported from both sides by a shaft 127 (see FIG. 7).

When the rolling elements 104 are fixed on the surface of the coil disk 101 and roll on or against the surface of the primary magnetic disk 102, the distance between the coil disk 101 and the primary magnetic disk 102 is substantially constant. In this embodiment of the invention, the distance between the primary magnetic disk 102 and the coil disk 101 is equal to approximately one half of the diameter of the rolling elements 104. In addition, the size of the air gap 120 between the surfaces of the magnets 106 and the surfaces of the cores 108 may be substantially constant. Thus, each rolling element 104 is interposed between one surface of the primary magnetic disk 102 and an opposing surface of the coil disk 101, whether fixed to the primary magnetic disk 102 and rolling on or against the surface of the coil disk 101 or fixed to the coil disk 101 and rolling on or against the surface of the primary magnetic disk 102. Some rolling elements 104 may be fixed to the coil disk 101 and others to the primary magnetic disk 102.

When the secondary magnetic disk 103 is present, an additional set of rolling elements 104 may be fixed on the surface of the coil disk 101 facing the secondary magnetic disk 103 and roll on or against the surface of the secondary magnetic disk 103 such that the distance between the coil disk 101 and the secondary magnetic disk 103 is also substantially constant. Each rolling element 104 is interposed between one surface of the secondary magnetic disk 103 and an opposing surface of the coil disk 101, whether fixed to the secondary magnetic disk 103 and rolling on or against the surface of the coil disk 101 or fixed to the coil disk 101 and rolling on or against the surface of the secondary magnetic disk 103. Some rolling elements 104 may be fixed to the coil disk 101 and others to the secondary magnetic disk 103. It is also possible to have the same rolling elements fixed to the coil disk 101 and roll on or against surfaces of both the primary magnetic disk 102 and the secondary magnetic disk 103.

The number of magnets 106 on the coil disk 101 can vary, but more magnets 106 provide a higher frequency that, in turn, increases the EMF for a given RPM of the wind turbines 109, 110.

FIG. 6 shows a segment of the secondary magnetic disk 103, i.e., a front or rear view, that is mechanically connected to the primary magnetic disk 102 via supporting elements 105. Supporting elements 105 serve to transfer rotation from the primary magnetic disk 102 to the secondary magnetic disk 103. The construction, composition and other properties of the secondary magnetic disk 103 may be the same as or similar to that of the primary magnetic disk 102.

Figure 7:
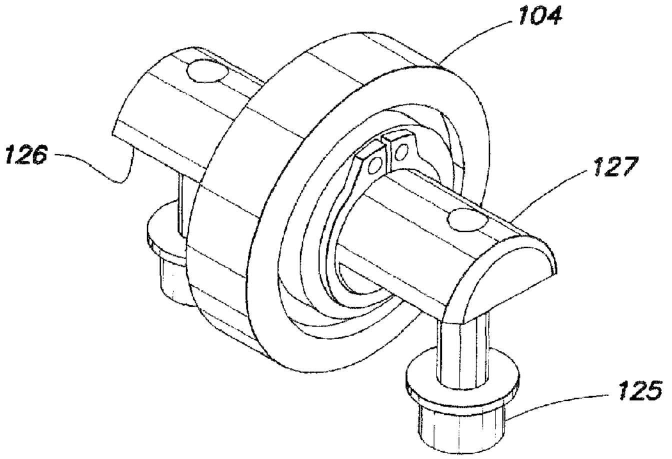
FIG. 7 shows the rolling element in the alternator in accordance with the present invention.

FIG. 7 shows a non-limiting, exemplifying rolling element 104. Rolling element 104 is preferably a ball bearing, but other types of rolling elements can be used. As shown in FIG. 7, rolling element 104 includes a shaft 127 extending through a center of the roller, i.e., about which shaft 127 the roller rotates, and that is tighten or otherwise attached to the surface of the primary magnetic disk 102 or the secondary magnetic disk 103 by a screw 125 such that a machined plane 126 of the rolling element 104 rests on the surface of the primary magnetic disk 102 or the secondary magnetic disk 103. One such screw 125 is arranged at each end region of the shaft 127 to provide support for the shaft 127 and thus for the rolling element 104. Different mechanisms for attaching the shaft 127 to the primary magnetic disk 102 or the secondary magnetic disk 103 may be used in the invention.

Figure 8:
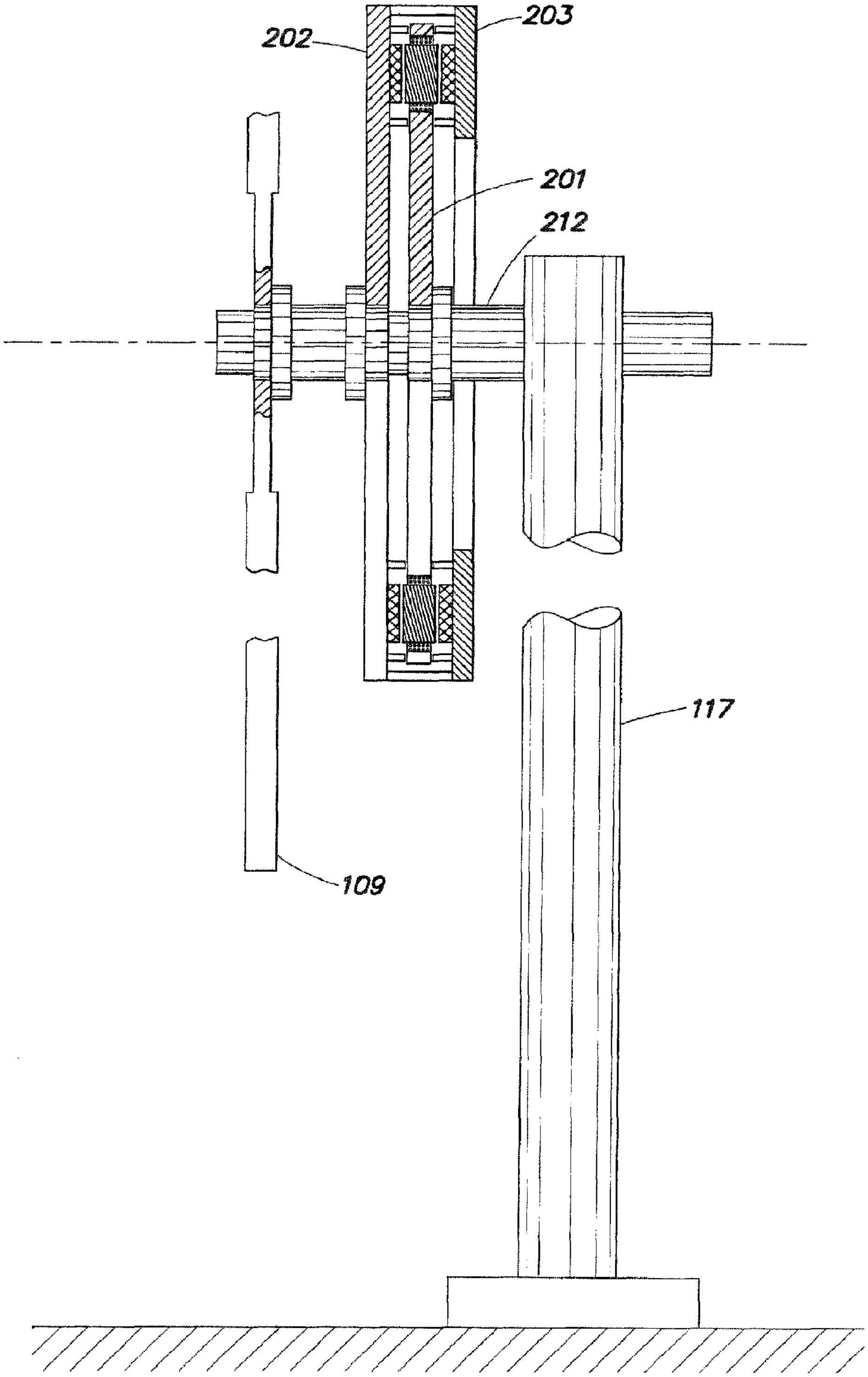
FIG. 8 shows another embodiment of a wind turbine arrangement including an alternator in accordance with the present invention.

FIG. 8 shows another embodiment of the invention wherein there is only a set of turbine blades on a single wind turbine 109. A coil disk 201 is stationary and mechanically connected to the main tower assembly 117 through a coupling 212 so that it is non-rotational and fixed in place. A main or primary magnetic disk 202 has the same or similar construction, composition and other properties as primary magnetic disk 102, while secondary magnetic disk 203 has the same or similar construction, composition and other properties as secondary magnetic disk 103. Remaining features of this embodiment are the same or similar to those described above.

The embodiment shown in FIG. 8 is simpler than the embodiment shown in FIG. 1, but the relative RPM between the primary and secondary magnetic disks 202, 203 and the coil disk 201 is approximately half that for a given wind relative to the embodiment shown in FIG. 1 and thus, the generated EMF is approximately half as well.

Figure 9:
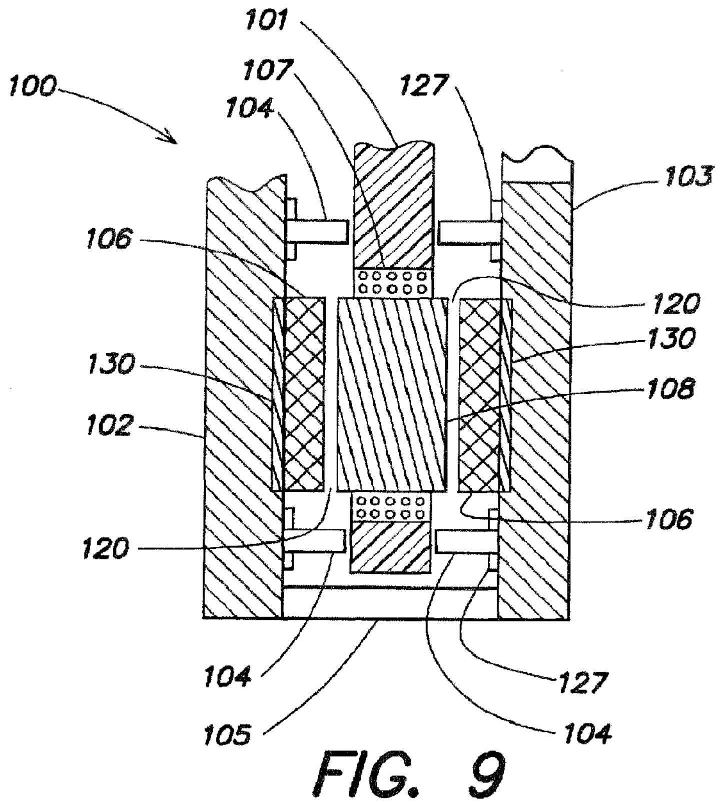
FIG. 9 is a partial cross-sectional view of the alternator in accordance with the invention showing an alternative mounting of magnets on the magnetic disks of the alternator.
Figure 10:
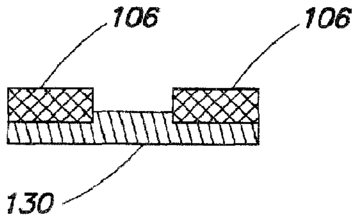
FIG. 10 is a cross-sectional view of the magnet mounting shown in FIG. 9.

FIG. 9 shows a portion of an alternator in accordance with the invention wherein the magnets 106 on the primary and secondary magnetic disks 102, 103 are mounted to a supporting element 130 in pairs. As shown more clearly in FIG. 10, a supporting element 130 supports a pair of magnets 106. Supporting elements 130, each with a pair of magnets 106, are then attached or fixed to the primary and secondary magnetic disks 102, 103. Supporting elements 130 may support more than two magnets 106.

Supporting elements 130 are preferably made of magnetic steel, such as low-carbon magnetic steel, and serve to increase the magnetic flux thereby increasing the EMF of the alternator section 100.

Figure 12:
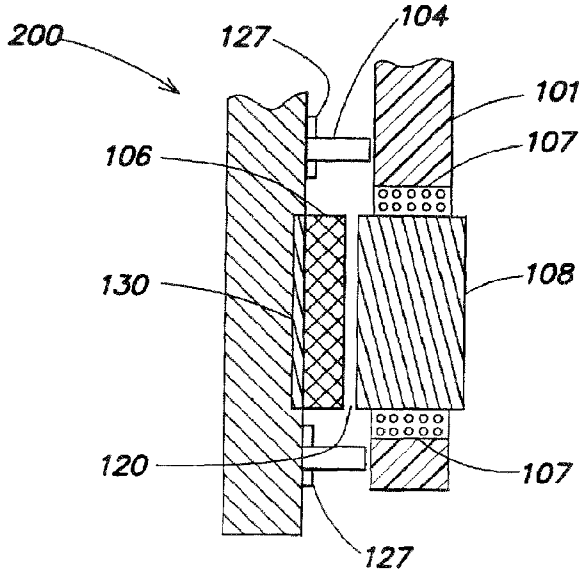
FIG. 12 is an enlarged, partial cross-sectional view of the alternator shown in FIG. 11 showing structure around the air gap.
Figure 11:
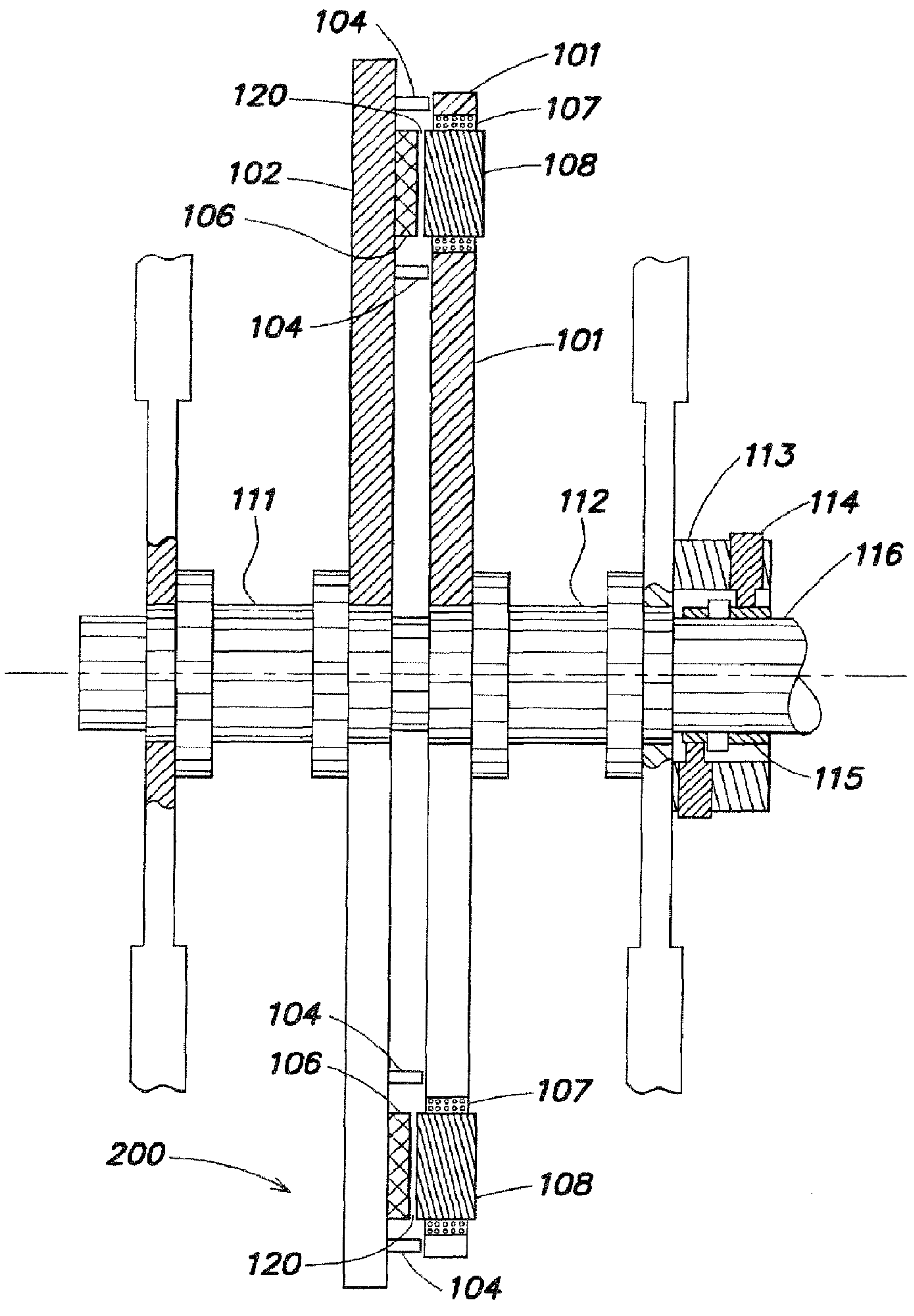
FIG. 11 shows yet another embodiment of a wind turbine arrangement including an alternator in accordance with the present invention.

FIGS. 11 and 12 show an embodiment wherein the alternator section 200 includes only the primary magnetic disk 102, and no secondary magnetic disk 103, and wherein, the magnets are mounted in supporting elements 130. This arrangement is not as efficient as the embodiment shown in FIG. 1 because each magnetic core 108 is cooperating with only one set of magnets 106 on the primary magnetic disk 102, and not two sets as in the embodiment shown in FIG. 1.

Figure 13:
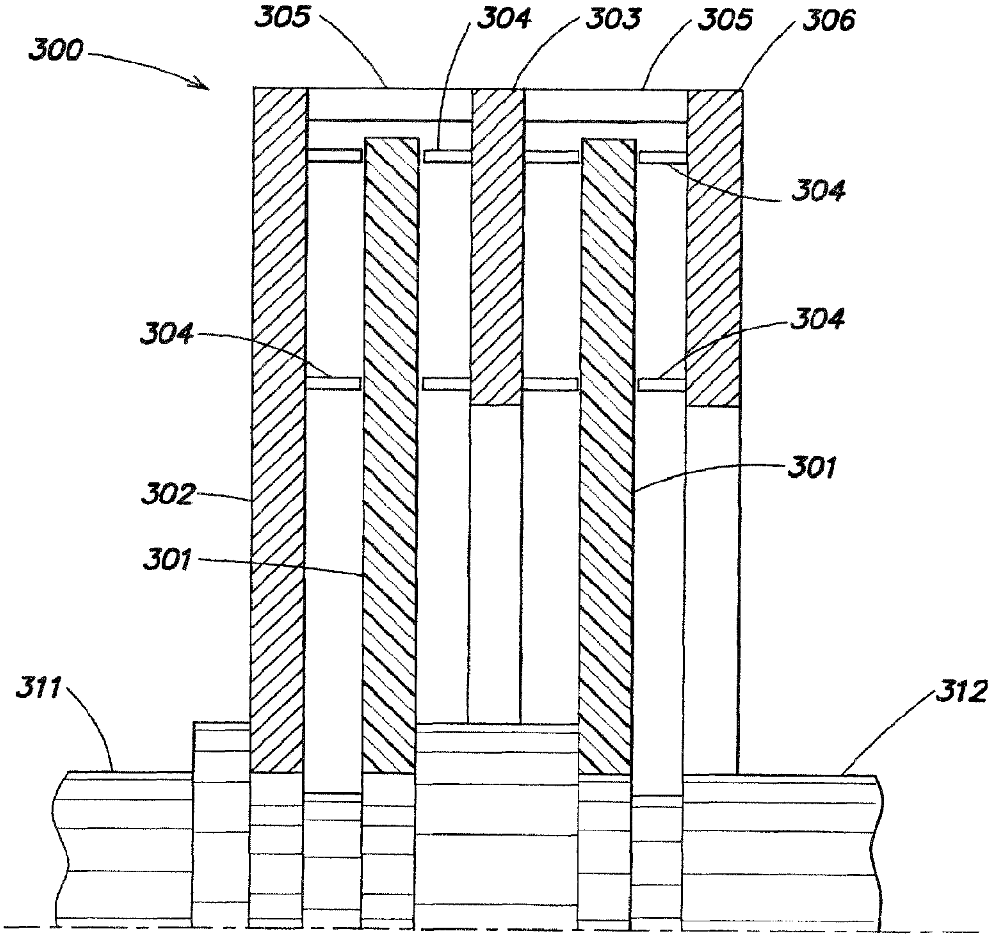
FIG. 13 is a partial view of another embodiment of a wind turbine arrangement including an alternator in accordance with the present invention that includes two coil disks and three magnetic disks.

FIG. 13 shows an embodiment wherein the alternator section 300 includes two coil disks 301, a primary magnetic disk 302, a secondary magnetic disk 303 connected to the primary magnetic disk 302 by supporting elements 305, and a third magnetic disk 306 connected to the secondary magnetic disk 303 by supporting elements 305. Supporting elements 305 correspond to supporting elements 105 described above and rolling elements 304, situated between the coil disks 301 and the magnetic disks 302, 303, 306, correspond to rolling elements 104. Bearing housings 311, 312 correspond to bearing housings 111 and 112, respectively.

Figure 14:
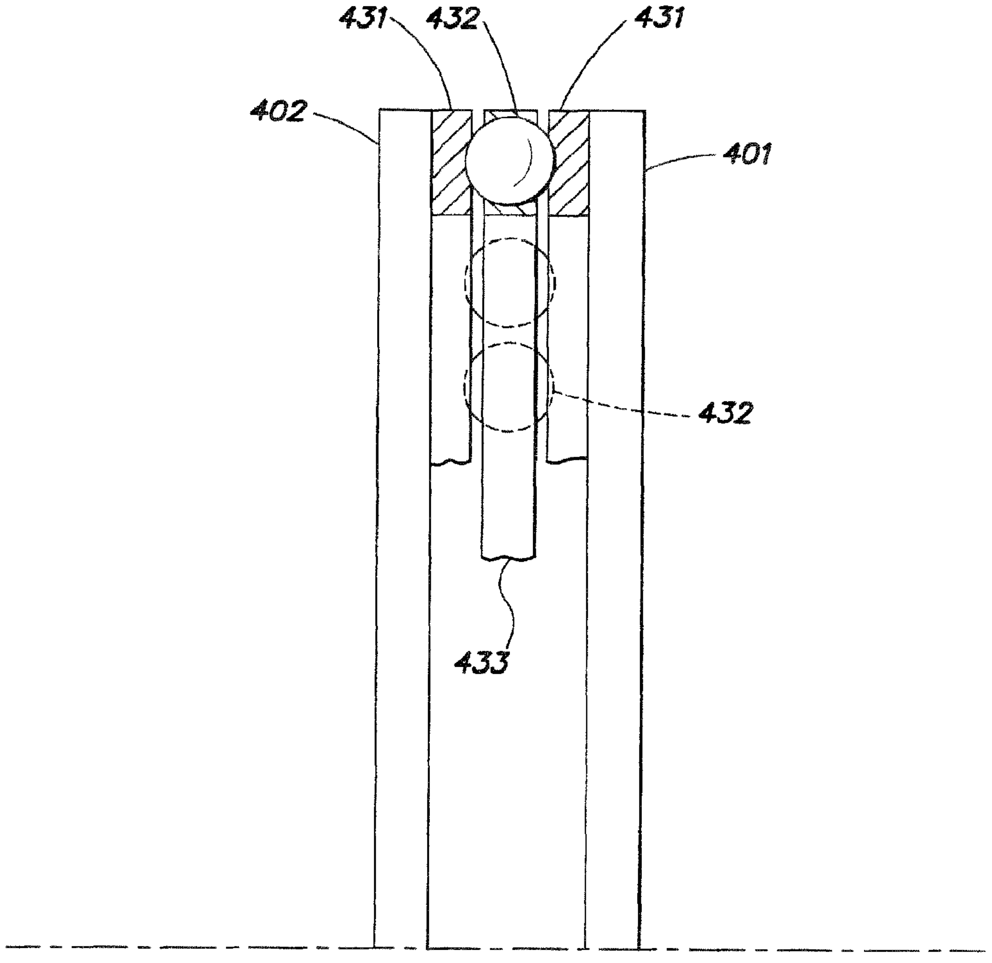
FIG. 14 is a partial view of yet another embodiment of a wind turbine arrangement including an alternator in accordance with the invention that includes thrust bearings as rolling elements.

FIG. 14 shows part of an embodiment of an alternator in accordance with the invention wherein a coil disk 401 and a primary magnetic disk 402 have substantially the same or similar properties as coil disk 101 and primary magnetic disk 102, respectively, described above, or any of the other coil disks and magnetic disks described herein. As for rolling elements, the embodiment shown in FIG. 14 includes thrust bearings that maintain the air gap between the surfaces of the magnets (not shown) on the magnetic disk 402 and the surfaces of the magnetic cores (not shown) of the electromagnetic assemblies on the coil disk 401.

Thrust bearings are preferably large diameter thrust bearing. Exemplifying thrust bearings for use in the invention include a cage assembly 433 of bearings 432 that have spherical or cylindrical shape, and may be made from ceramic or steel. One ring 431 is situated between the bearings 432 and the coil disk 401, attached to the coil disk 401, and another ring 431 is situated between the bearings 432 and the primary magnetic disk 402, attached to the primary magnetic disk 402. Bearings 432 are thus enclosed by the cage assembly 433 and rings 431 and enable relative rotational movement between the coil disk 401 and the primary magnetic disk 402.

Technical details of thrust bearings are well known in the field of bearings. The selection of appropriate, commercial or specially designed thrust bearings for use in the invention is possible for one skilled in the art to which this invention pertains, without undue experimentation, in view of the disclosure herein.

All of the features described in each of the above embodiments may be applied in any of the other embodiments, the extent possible.

Operation of the arrangement shown in FIG. 1 will now be described. When the blades of the wind turbines 109 and 110 are expose to wind, they rotate in opposite directions and the rotational force is transmitted from the blades through bearing housing 111 and 112 to the primary magnetic disk 102 and to the coil disk 101, respectively. Primary magnetic disk 102 transmits its rotation to the secondary magnetic disk 103 via supporting elements 105. The electromagnetic assemblies on the coil disk 101 rotate through the magnetic flux generated by the magnets 106 on the primary and secondary magnetic disks 102 and 103 at a relative angular velocity that is twice the velocity of the wind turbines 109 or 110. Motion of the coils 107 through the magnetic flux causes induction of EMF in the coils 107 that causes current through a connected load.

Strong attraction forces between the magnets 106 and the magnetic cores 108 are balanced by the rolling elements 104 that provide a force in a direction separating the magnet is 106 from the magnetic cores 108 thereby maintaining an air gap 120 between the magnets 106 and the magnetic cores 108 and allowing the relative motion between the disks 101, 102, 103.

The angular positioning of the coils 107 relative to the angular positioning of the magnets 106 will be preferably in multi-phase order to avoid an angular positioning wherein all the magnetic cores 108 and the magnets 106 are in peak attraction together.

The coils of each phase may be arranged in parallel or serial connections. The outlet of all phases may be connected in Y or delta connections, which connections are known to professional electricians and other skilled in the art to which this invention pertains. The phases may then be connected to a multi-phase rectifier, and the rectifier's two-wire outlet may be connected to a load through the carbon brush assembly. Other types of connections are possible.

In the embodiment of the invention shown in FIG. 8, the coil disk 201 is stationary, and the primary and second magnetic disks 202 and 203 move. Rectified electricity passes directly to the load without the need of carbon brush assembly. All other details of the operation of the embodiment shown in FIG. 2 are identical to those of the embodiment shown in FIG. 1.

The above description and discussion relates to an axial flux alternator having a specific construction. However, all axial flux alternators that have at least one magnetic disk and at least one coil disk, at least one of which rotates relative to the other, and which define air gaps between magnets on the magnetic disk and magnetic cores on an adjacent coil disk, which air gaps are fixed and maintained by rolling elements attached to one of the disks and roll on or against the surface of the other, adjacent disks, or between the surfaces of the adjacent disks, are intended to be encompassed and protected by this patent application.

The disclosure above also relates to a method for designing a wind turbine arrangement for improved operation relative to existing wind turbine arrangements. The method seeks to set and maintain air gaps 120 between magnets on a magnetic disk and magnetic cores on a coil disk, between which disks there is relative rotation. This method for maintaining operability of wind turbine arrangement would therefore include rotatably coupling the coil disk and/or the magnetic disk to a respective wind turbine to cause, when the wind turbine(s) is/are exposed to wind, relative rotation between the coil disk and the magnetic disk during which the magnetic cores of the coil disk and the magnets of the magnetic disk are brought into and out of magnetic engagement with one another, i.e., the magnetic cores pass into and out of the magnetic fields generated by the magnets. This causes generation of electricity in a manner known to those skilled in the art.

Rolling elements, as described above, are interposed between a surface of the coil disk and a surface of the magnetic disk that face each other to maintain the air gaps between a surface of the magnetic cores of the coil disk and the magnets of the magnetic disk to enable the relative rotation between the coil disk and the magnetic disk. Contact between the magnets and the magnetic cores could prevent operation of the wind turbine arrangement and possibly damage the arrangement.

The rolling elements are selected to maintain the air gaps in a range from, for example, about 1.5 mm to about 3.0 mm. The size of the air gaps may be determined first, based on for example, the dimensions and properties of the magnets and magnetic cores and desired. EMF, and then the rolling elements selected which will provide this size air gaps.

When another magnetic disk is provided, as in FIG. 1, and the magnetic disks 102, 103 are connected to one another, a size of the supporting elements is also a factor in maintaining the air gaps within the desired range.

Figure 16:
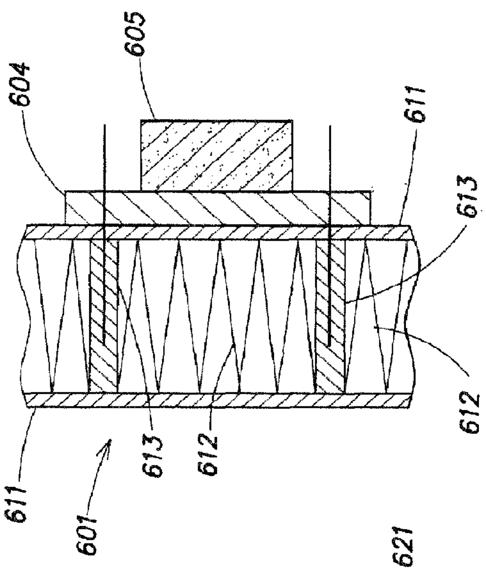
FIG. 16 is a detail cross-section view of a segment of one of the generator's magnetic disks.
Figure 17:
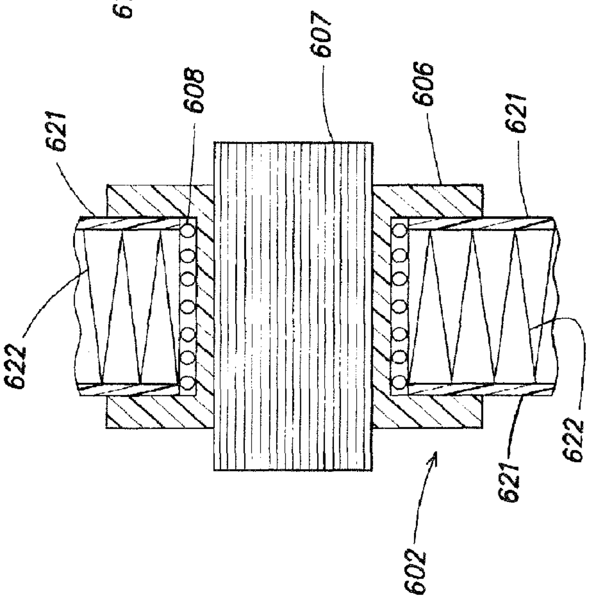
FIG. 17 is a detail cross-section view of segment of the generator's coil disk.
Figure 15:
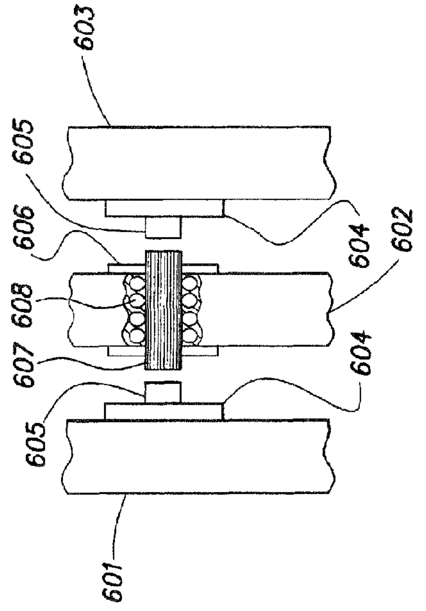
FIG. 15 is a side view partial cross cutting of the generator of the present invention, with two magnetic disks and one coil disk.

Referring now to FIGS. 15-17, in this embodiment, the axial flux generator comprises a first magnetic disk 601, a coil disk 602 and a secondary magnetic disk 603. The magnetic disks 601, 603 and the coil disk 602 may have similar properties and components as the magnetic and coil disks, respectively, described elsewhere herein, e.g., the magnetic disks 601, 603 include rolling elements 104 as do magnetic disks 102, 103.

However, it is also conceivable that the magnetic disks 601, 603 and coil disk 602 have different features than magnetic disks and coil disks, respectively, described elsewhere herein, e.g., the magnetic disks 601, 603 may not include the same rolling elements as do magnetic disks 102, 103 described above. Rather, rolling elements, other than those having the structure of rolling elements 104, but that maintain air gaps between the surface of the magnetic cores on the coil disk 602 and the surface of the magnets on the magnetic disks 601, 603, may be used in accordance with the invention. For example, rolling elements may be fixed on the coil disk 602 and roll relative to the magnetic disks 601, 603. Alternatively, it is conceived that rolling elements may be arranged to roll in or on ring-shaped tracks assembled or attached to the coil disk 602 or to the magnetic disk 601, 603.

Magnets 605 are arranged on the magnetic disks 601, 603. More specifically, magnets 605 may be glued to base plates 604, or otherwise removably or permanently attached to or mounted on the base plates 604 by suitable attachment means, e.g., screws or other removable fasteners or permanent fasteners. Base plates 604 are in turn, attached to the magnetic disks 601 and 603 by any suitable attachment means, e.g., screws or other removable fasteners or permanent fasteners.

The number of magnets 605 on each magnetic disk 601, 603 can vary according to, for example, the diameter of the disks 601, 603 and the magnetic design of the generator 600, or according to any of the other characteristics described elsewhere herein.

On the coil disk 602, magnetic cores 607 are fixed into plastic bobbins 606, and conductive coils 608 are wound around the bobbins 606 and the magnetic cores 607, e.g., one or more coils 608 around each magnetic core 607, to form electromagnetic assemblies. In each electromagnetic assembly, the plastic bobbin 606 is thus interposed between the magnetic core 607 and the coil 608 (see FIG. 17). Plastic bobbins 606 are also referred to as coil bobbins herein, when each is the structure around which an conductive coil is wound.

The plastic bobbins 606 with the magnetic cores 607 and the coils 608, i.e., the electromagnetic assemblies, are mounted on coil disk 602, preferably by screws. Other means to attach the electromagnetic assemblies to the coil disk 602 are also possible.

The magnetic cores 607 are preferably made from laminations of silicon steel, but other types of magnetic steel can be used. The bobbins 606 are preferably made from peek type of plastic.

FIG. 16 shows details of the first magnetic disk 601, magnetic disk 603 having an identical construction. The magnetic disk 601 is constructed from at least three layers: two outer surface layers 611 are preferably made of extremely strong material, such as carbon fiber, but other strong materials can be used. Outer surface layers 611 are thin, yet strong in view of the material from which they are made. One skilled in the art of wind turbine arrangements and/or axial generators would understand the characteristics and/or properties that render a material a strong material that can be used in the invention.

An inner layer or core 612 is interposed between the two outer layers 611 and serves as a lightweight and soft layer made of airy, low density materials, such as a honeycomb structure made of for example, aluminum, fiberglass or polypropylene, but other materials such as foam or balsa can be used. One skilled in the art of aircraft structures would understand the characteristics and/or properties that render a material a lightweight, airy, soft and/or low density material that can be used in the invention for the disclosed purpose(s).

Honeycomb structures that may be used as or included in the inner layer 612 are well known in the industry. Commercial examples of honeycombs structures, made of aluminum or other materials, are disclosed at robotcombat.com/store-_carbon_fiber_sand.html and acp-composites.com/home.php?printable-Y&cat-4707, both of which are incorporated by reference herein. The thickness of each outer layer 611, also considered as a skin material, may in the order of about 1 mm thick, for example 1 mm thick carbon fiber having a strength of about 1600 MFa. Another possible outer layer has a thickness of about 1.5 mm, is made of fiberglass and has a strength of about 1400 MPa. Other materials with different thicknesses and strengths my also be used in accordance with the invention.

Supporting elements 613 are designed for two primary purposes, namely, to tighten the base plates 604 to surface of the magnetic disk 601 (the line extending through the magnetic disk 601 and the base plate 604 represents an attachment member such as a screws), and they are used as constructive elements between the outer surface layers 611 within the light and soft layer 612. More generally, supporting elements 613 are used to secure or otherwise connect the magnets 605 to the magnetic disks 601, 603 by providing a suitable structure into which an attachment or fastening member, such as a screw, can pass. The attachment member thus engages with the magnet 605 and/or base plate 604 and the supporting element 613 through the outer layer 611 thereby securing the magnet 605 and base plate 604 to the magnetic disk 601, 603.

Supporting elements 613 may be cylindrical elements, but may also have different cross-sectional shapes. Other supporting or reinforcement structure may be used instead of supporting elements 613 within the magnetic disk 602, or entirely omitted, and thus supporting elements 613 should be considered as optional.

Outer layers 611 and inner layer 612 can be made of conductive materials, such as carbon fiber and aluminum honeycomb, respectively.

FIG. 17 shows details of the coil disk 602. The number of electromagnetic assemblies, of the bobbins 606, magnetic cores 607 and coils 608, can vary by the diameter of the coil disk 602 and the electromagnetic design of the generator 600.

Coil disk 602 may be constructed from at least three layers. Outer layers 621 are made of strong, non-conductive materials, such as fiberglass, while an inner layer or core 622 is made of non-conductive light and airy material, such as non-conductive honeycomb, foam or balsa. Outer surface layers 621 are thin, yet strong in view of the material from which they are made. The non-conductive features of the coil disk 602 are highly important because of the need to eliminate eddy currents within the coil disk 602.

The electromagnetic assemblies of the bobbins 606, the magnetic cores 607 and the coils 608 are attached to the coil disk 602 to ensure that they are maintained securely thereon during use of the wind turbine including the generator 600. To this end, the bobbins 606 may be attached directly to the outer layers 621 of the coil disk 602 by screws or the like, or by using supporting elements like supporting elements 613 described above in connection with FIG. 16. In the latter case (not shown), the screws or other attachment members would engage with the bobbins 606 and pass into or through the supporting elements to thereby secure and connect the bobbins 606 to the supporting elements with the outer layer 621 of the coil disk 602 therebetween.

The structure of the magnetic disks 601, 603 and coil disk 602 in FIGS. 15-17 may be used in any of the other embodiments described herein. With the construction of the magnetic disks 601, 603 and coil disk 602 from thin and strong or rigid outer layer and a light-weight inner or core layer sandwiched therebetween, ultra-light and strong large diameter magnetic and coil disks for axial flux generators are provided.

Figure 18:
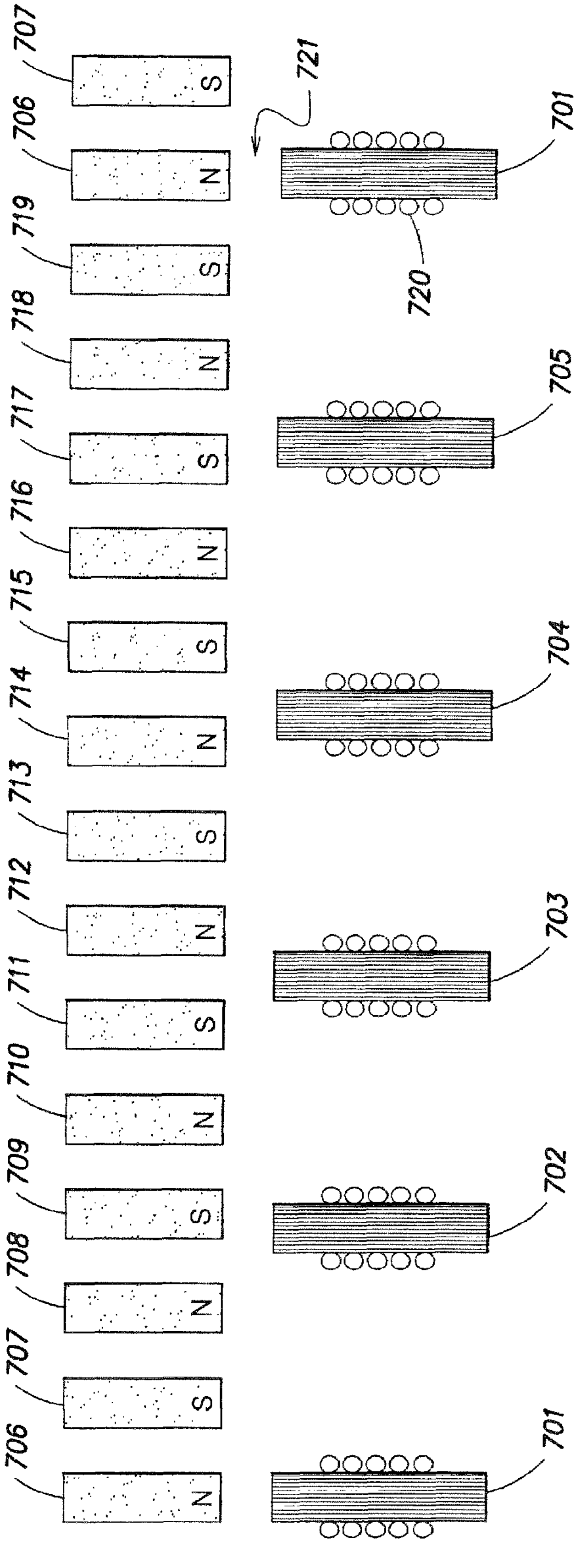
FIG. 18 is a schematic of part of a coil disk and an adjacent magnetic disk of an axial flux generator in accordance with the invention illustrating association of a group of coils on the coil disk to a group of magnetic rows on the magnetic disk.

Referring now to FIGS. 18-21, these drawings relate to an embodiment with thirty coil bobbins on a coil disk and eighty-four magnetic rows on a magnetic disk of the generator, each magnetic row containing at least one and preferably a plurality of magnets. Although FIG. 18, shows elements representing magnetic rows on a single magnetic disk facing a single coil disk including magnetic cores around which are wound coils, an axial flux generator with two or more magnetic disks as well as possibly two or more coil disks are envisioned. In a preferred embodiment, the axial flux generator would include a single coil disk and two magnetic disks, one on each side of the coil disk, as disclosed above and illustrated in, e.g., FIG. 1.

With thirty coils bobbins on the coil disk, the angular distance between the centers of any coil bobbin and its neighbor is equal to 360/30=12 degrees. An angular distance between any magnetic row and its neighbor is equal to 360/84=60/14=about 4.286 degrees. Since 12 (degrees)×5=60 and 60/14 (the angular distance)×14=60, every 60 degrees, the relative angular position between any given five coil bobbins on the coil disk and the magnetic rows on the magnetic disk will repeat itself.

FIG. 18 shows a schematic drawing of a segment of the coil disk and the magnetic disk, wherein the angular distances are represented by linear distances (for the sake of ease of illustration). In FIG. 18, coil bobbins 701, 702, 703, 704 and 705 are five consecutive coil bobbins while the sixth bobbin 701 is in the same magnetic position as the first coil bobbin 701. The five coil bobbins 701-705 face fourteen consecutive magnetic rows 706-719, while the fifteenth magnetic row 706 is in the same electromagnetic position as the first magnetic row 706. Conductive coils 720 are wound around the magnetic cores of the coil bobbins 701-705.

An air gap 721 is maintained between the magnetic cores of the coil bobbins 701-705 and the magnetic rows 706-719, or more generally between a surface of the magnetic cores of the coil bobbins 701-705 on the coil disk and the magnetic rows 706-719 on the magnetic disk, by rolling elements (not shown) which may be of the type disclosed above or other comparable air-gap maintaining elements.

An important advantage of the foregoing electromagnetic design is that as the magnetic attraction is substantially uniform, a minimal magnetic resistance to relative rotation between the magnetic disk(s) and the coil disk exists. Each group of coil bobbins 701-705 that is exposed to the same electromagnetic conditions (in this case: six coil bobbins 701; six coil bobbins 702; six coil bobbins 703; six coil bobbins 704; six coil bobbins 705), performs as one phase and can be electrically connected in serial connection, parallel connection or in any combination of serial and parallel connections. By using these connections flexible high voltage and/or high current output can be achieved.

Figure 19:
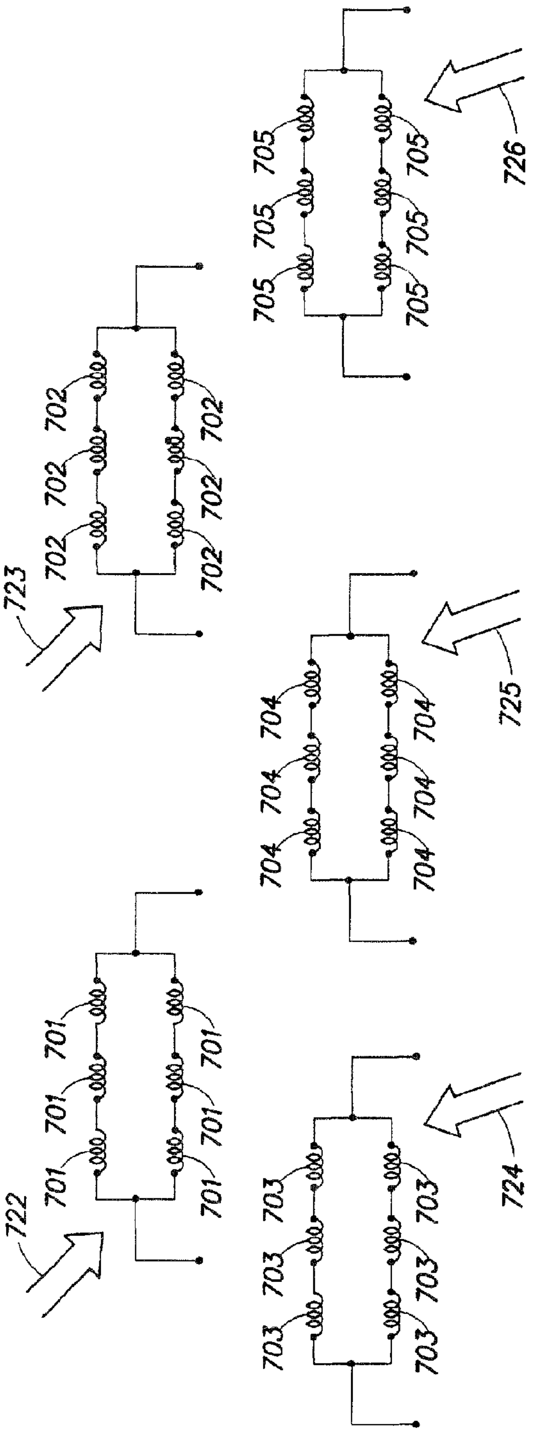
FIG. 19 illustrates serial and parallel electrical connections of the phases of the axial flux generator shown in FIG. 18.

FIG. 19 illustrates serial and parallel electrical connections of the phases of the axial flux generator of the present invention. Elements 701-705 are the coil bobbins of each phase, and 722-726 are the electrical output of the five phases, respectively.

Figure 20:
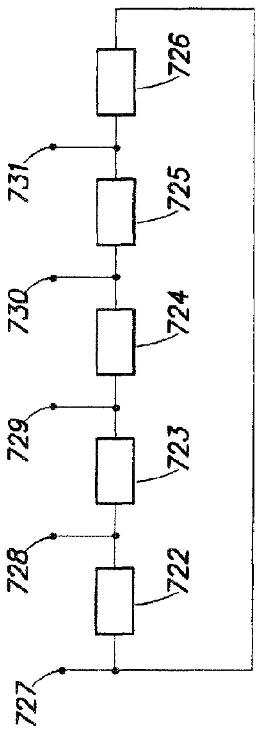
FIG. 20 illustrates a polygon type electrical connection of the five phases of the axial flux generator shown in FIG. 18.

FIG. 20 demonstrates a polygon type electrical connection of the five phases, and a star type electrical connection is feasible as well. A polygon type electrical connection and a star type electrical connection are known to those skilled in the art, and details of these connections are therefore not set forth herein. Elements 727-731 represent the outlet of the five phases of the electrical connections 722-726 (see FIG. 19).

Figure 21:
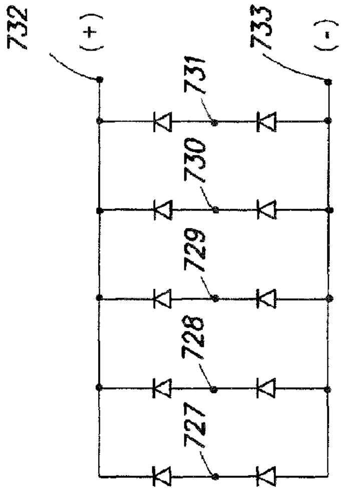
FIG. 21 illustrates a multiphase rectifier of the five phases of the axial flux generator shown in FIG. 18.

FIG. 21 presents a multi phase rectifier, wherein the five phases 727-731 outlets are connected to multiphase rectifier inputs. Elements 732 and 733 are the plus and minus outputs of the rectifier, respectively.

Accordingly, FIGS. 18-21 illustrate an embodiment of the invention wherein an axial flux generator would include thirty coil bobbins, eighty-four magnetic rows and five phases. However, the present invention encompasses multi megawatt generator comprised of two hundred forty coil bobbins (thirty times eight) and six hundred seventy two magnetic rows (eighty-four times eight) arranged in a five-phase configuration. As long as the ratio between the number of bobbins, the number of magnetic rows and the angular distances remain the same (5:14), the rules that have been explained apply and all versions derived from such ratios are encompassed within the scope and spirit of the invention.

Moreover, the invention is not limited to five phases and encompasses different numbers of phases. For example, the invention can be designed to provide an axial flux generator with seven phases by providing forty-two coil bobbins on the coil disk and one hundred eight magnetic rows on each magnetic disk. As long as the angular distances between the centers of the magnetic rows is equal, the angular distances between the centers of the magnetic cores of the coil bobbins is equal and the rules that have been explained apply, numerous different and multiphase axial flux generators can be constructed in accordance with the invention and all are encompassed within the invention and considered by the inventors to be part of their invention. For example, for a seven phase axial flux generator, the coil disk may include 294 coil bobbins while each magnetic disk includes 756 magnetic rows.

For the avoidance of doubt as to what the inventors consider as their invention, one set of rules that applies to one or more embodiments of the axial flux generator of the present invention requires that the axial flux generator consist of any odd number of phases equal to or larger than three, whereas the number of magnetic rows on each magnetic disk divided by the number of coil bobbins in each phase on the coil disk must be an even number larger than the number of phases.

The relative position and numerical ratio of the coil bobbins and magnetic rows as described in connection with FIGS. 18-21 can be applied to any of the wind turbine arrangements disclosed herein. Such embodiments of the invention would provide a large diameter wind turbine span with low RPM's and with minimal resistance to rotation that is caused by magnetic attractions. Further, the design allows smooth rotational motion between the magnetic disk(s) and the coil disk(s) and allows the large number of electrically autonomous coil bobbins to be electrically connected so that the output of the generator can be high voltage DC.

Figure 22:
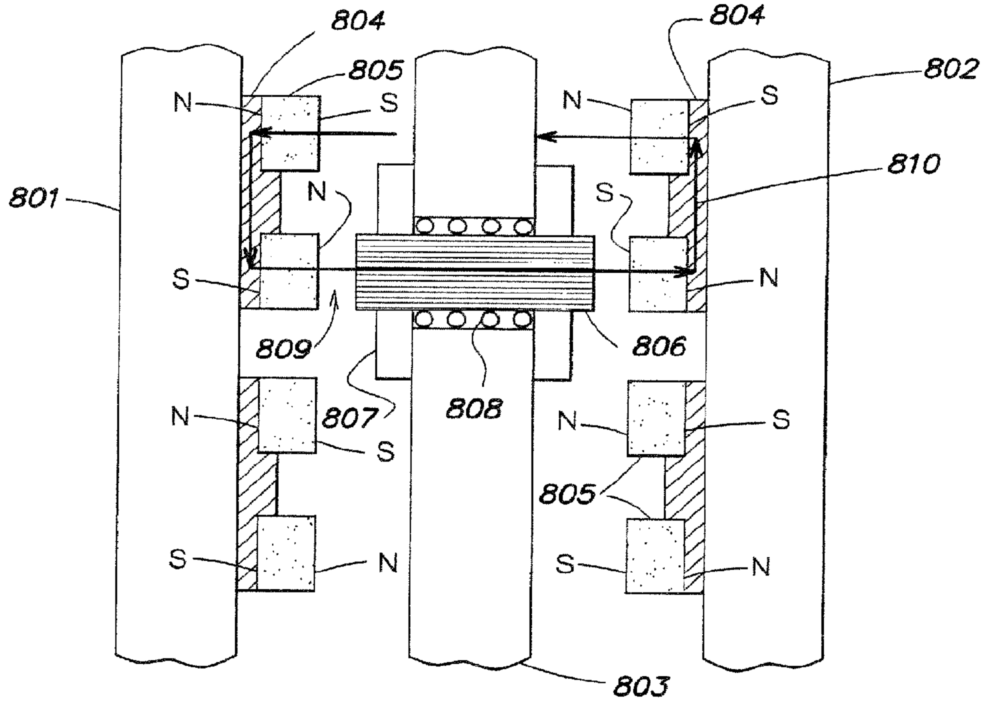
FIG. 22 shows segments of a coil disk positioned between two magnetic disks and exemplifying an arrangement of magnetic rows of magnets on the magnetic disks for use in any of the axial flux generators in accordance with the invention.
Figure 23:
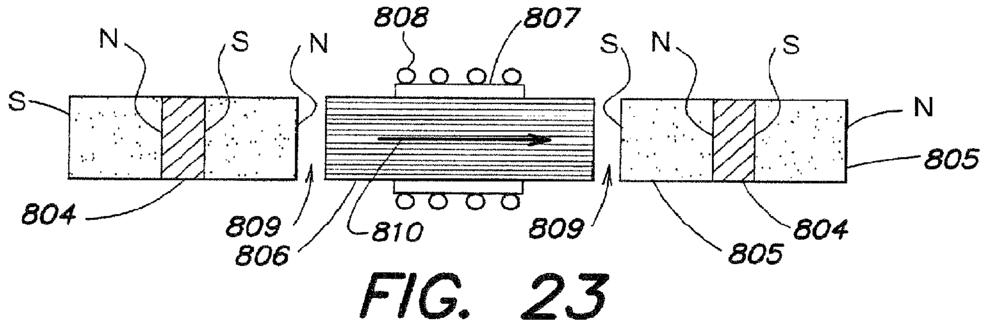
FIG. 23 schematically illustrates a linear equivalent of the magnetic flux circuit of FIG. 22 with the magnetic core in one position, taken along the line 810 in FIG. 22.
Figure 24:
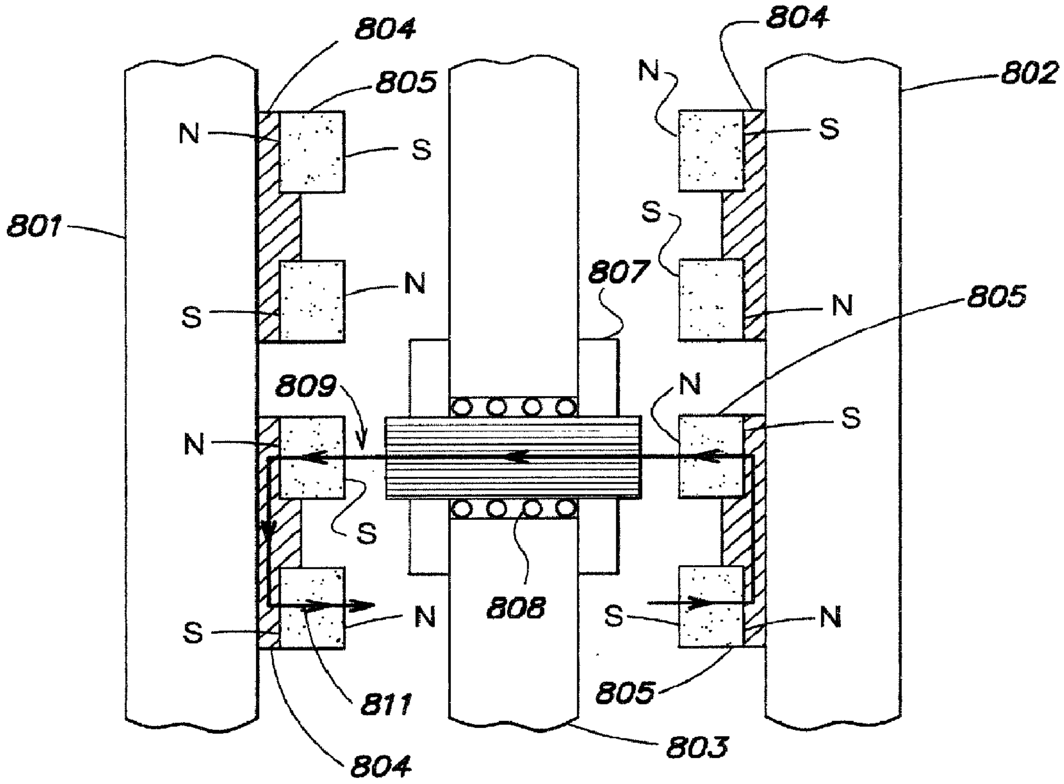
FIG. 24 is similar to FIG. 22 but with the coil disk rotated to a position between different magnetic rows.

Referring now to FIGS. 22-25, a variation relating to the magnets on any of the magnetic disks in the axial flux generators disclosed herein is provided. FIGS. 22 and 24 show segments of a coil disk 803 positioned between a primary magnetic disk 801 and a secondary magnetic disk 802. Primary and secondary magnetic disks 801, 802 each contain rows of magnets 805, i.e., magnetic rows, with the magnets 305 being attached to the magnetic disks 801, 802 via base plates 804, also referred to as magnetic steel bases herein. This attachment may be as described above with respect to magnets 605 and base plates 604, e.g., by gluing.

More specifically, the magnets 805 are arranged on base plates 804 so that the polarity of the magnetic rows changes every adjacent or neighboring magnetic row (see the alternating N-S, S-N positioning in FIG. 22). If the outward polarity (the exposed pole) of the magnets 805 in a certain magnetic row is South, the outward polarity of the magnets 805 in any of its adjacent or neighboring magnetic rows is North. Thus, the magnetic row polarity on the magnetic disks 801, 802 are opposite one another. Assuming a certain magnetic row's outward polarity on primary magnetic disk 801 is North, the outward polarity of the respective magnetic row on the secondary magnetic disk 802 is South (see the uppermost magnets 805 in FIG. 22).

The magnetic steel bases 804 are preferably made of magnetic steel and ensure that every two magnetic rows that are attached to the same base 804 create a serial magnets' connection, with a strength that is almost equivalent to that of two magnets that are attached together (even though the magnets are arranged in different magnetic rows). As long as the thickness of the bases 804 is sufficient, this phenomena occurs. A preferred thickness of bases 804 is about half the width of the magnets 805.

Coil disk 803 includes magnetic cores 806, around which bobbins 807 are placed and conductive coils 808 are wound about the bobbins 807. Magnetic cores 806 are preferably made from laminations of silicon steel. Coil bobbins 807 are preferably made of plastic such as peek. The magnetic cores 806 are each glued into a housing of the respective bobbin 807, e.g., into a channel formed in the housing of the bobbin 807.

An air gap 809 is maintained between the magnetic cores 806 of the coil bobbins 807 and the magnetic rows of magnets 805, or more generally between a surface of the magnetic cores 806 of the coil bobbins 807 on the coil disk 802 and the magnetic rows on the magnetic disk 801, 802, by rolling elements (not shown) which may be of the type disclosed above or other comparable air-gap maintaining elements.

FIG. 23 schematically illustrates a linear equivalent of the magnetic flux circuit of FIG. 22 taken along the line 810 in FIG. 22, which represent the magnetic flux path. The two magnets 805 on the left side, each in a respective magnetic row, are serially connected through the magnetic base 804 and the polarity is from South to North toward the left surface of the magnetic core 806. The two magnets 805 on the right side, each in a respective magnetic row, are in opposite magnetic polarity (North to South). Thus, the magnetic flux through the magnetic core 806 is essentially equal to the sum of four magnetic rows' fluxes.

Figure 25:
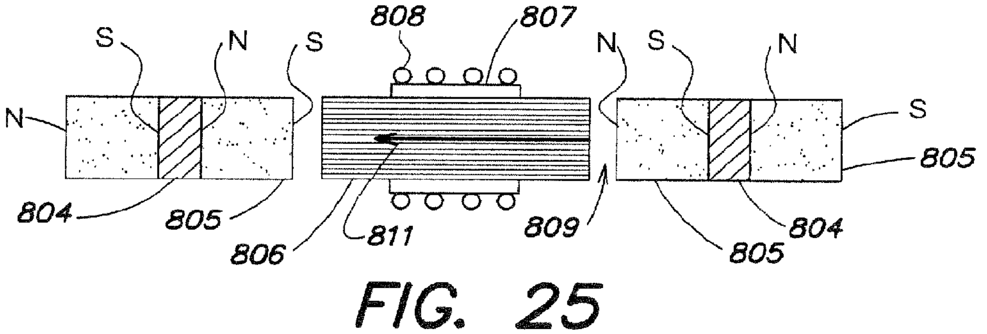
FIG. 25 schematically illustrates a linear equivalent of the magnetic flux circuit of FIG. 24, taken along the line 811 in FIG. 24.

FIG. 24 shows the coil disk 803 after a rotation to cause the magnetic core 806 to be brought between adjacent magnetic rows to those shown in FIG. 22, and FIG. 25 schematically illustrates the linear equivalent of the magnetic flux circuit of the coil disk 803 in this position. In this case, the magnetic flux path 811 through the magnetic core 806 in FIGS. 24 and 25 has an opposite direction to the magnetic flux path 810 through the magnetic core 806 when the coil disk 803 is in the position shown in FIGS. 22 and 23. This is represented by the opposite direction of arrows 810, 811 through the magnetic core 806 in FIGS. 23 and 25.

Advantages of the described arrangement of magnetic rows and magnetic cores include the possibility of inducing magnetic fields in the magnetic cores 806 from both sides of each magnetic core 806. Thus, for any angular maximum magnetic flux position, the induced magnetic fields in the magnetic cores 806 are a product of four magnetic rows serially connected. Assuming everything else being equal, these magnetic arrangements would produce more electrical power.

The above specifications relate to a specific design of axial flux generator. However, this design may be used in any axial flux generator that comprises at least one coil disk and at least two magnetic discs, with each coil disk being positioned between two magnetic disks. Further, this design requires each coil disk to include magnetic cores, each preferably surrounded by a coil bobbin about which is wound a conductive coil, while each magnetic disk comprises magnets arranged in opposite polarity pairs assembled on ferromagnetic bases. The magnetic cores on each coil disk face opposite polarity magnets from both sides at the maximum magnetic flux angular positions, so that the magnetic field that is induced in the magnetic cores is substantially the product of four magnets in serial magnetic connections. All such designs are considered inventions herein and encompassed by this application.

The foregoing features of an axial flux generator, taken individually or in any combination with one another, provide advantages and achieve desired objects of the invention, including a system for providing an air gap in axial flux alternators, and more particularly in large-diameter axial flux alternators, with a desired dimension and maintaining the air gap; an air gap construction and maintenance system for axial flux alternators, again in particular for large-diameter axial flux alternators, that is economical and simple to construct; a direct drive generator with minimal weight; a direct drive generator that constructed to be strong enough to meet climatic conditions present in an offshore wind project; and a direct drive generator that is economical to produce and whose long term maintenance is not costly.

Additional objects achieved by one or more embodiments of the present invention are to provide a large diameter axial flux generator with a high number of magnets and coil bobbins with minimal resistance to rotation that is caused by magnetic attractions; to provide a multi phase axial flux generator that can generate high DC voltage; to design such a generator to enable an economical production and low cost long term maintenance; to provide an axial flux generator with improved magnetic arrangements that minimize the amount of rare earth magnets required per unit of generated electrical power; to provide an axial flux generator with an improved magnetic steel design that will significantly reduce its total weight; and to design an axial flux generator to enable economical production and low cost long term maintenance.

It is to be understood that the present invention is not limited to the embodiments described above, but includes any and all embodiments within the scope of the following claims. While the invention has been described above with respect to specific apparatus and specific implementations, it should be clear that various modifications and alterations can be made, and various features of one embodiment can be included in other embodiments, within the scope of the present invention.

The invention claimed is:

1. A wind turbine arrangement, comprising:

an axial flux alternator for generating electricity, said alternator comprising:

at least one coil disk;

magnetic cores with conductive coils arranged on each of said at least one coil disk;

at least one magnetic disk arranged adjacent to said at least one coil disk; and magnets arranged on each of said at least one magnetic disk;

rolling elements arranged between facing surfaces of said at least one coil disk and said at least one magnetic disk to maintain air gaps between a surface of said magnetic cores on said at least one coil disk and said magnets on said at least one magnetic disk;

said alternator generating electricity from relative rotation between said at least one coil disk and said at least one magnetic disk during which said magnetic cores of said at least one coil disk and said magnets of said at least one magnetic disk are brought into and out of magnetic engagement with one another; and at least one wind turbine, at least one of said coil disk or one of said magnetic disk being coupled to said at least one wind turbine to cause, when said wind turbine is exposed to wind, a relative rotation between said at least one coil disk and said at least one magnetic disk;

at least one of said at least one coil disk and said at least one magnetic disk comprising:

at least two outer layers of a strong material; and at least one inner lightweight layer arranged between said at least two outer layers of strong material.

2. The wind turbine arrangement of claim 1, wherein said at least two outer layers are made from carbon fiber and said at least one inner layer is made from a honeycomb structure, foam or balsa.

3. The wind turbine arrangement of claim 1, wherein said at least one of said at least one coil disk and said at least one magnetic disk further comprises supporting elements arranged within said inner layer.

4. The wind turbine arrangement of claim 1, wherein said at least one coil disk comprises said at least two outer layers and said at least one inner layer, said at least one coil disk further comprising supporting elements arranged within said at least one inner layer, said coils of said at least one coil disk being secured to said at least one coil disk in connection with said supporting elements.

5. The wind turbine arrangement of claim 1, wherein said at least one magnetic disk comprises said at least two outer layers and said at least one inner layer, said at least one magnetic disk further comprising supporting elements arranged within said at least one inner layer, said magnets of said at least one magnetic disk being secured to said at least one magnetic disk in connection with said supporting elements.

6. The wind turbine arrangement of claim 1, wherein said at least one coil disk comprises said at least two outer layers and said at least one inner layer, said at least two outer layers and said at least one inner layer consisting of non-conductive materials.

7. The wind turbine arrangement of claim 1, wherein said rolling elements are in contact with at least one of a surface of said at least one coil disk and a surface of an adjacent one of said at least one magnetic disk that face each other.

8. The wind turbine arrangement of claim 7, wherein said rolling elements are fixed to said at least one coil disk or to said adjacent one of said at least one magnetic disk and roll, slide or move on or against the surface of the other of said at least one coil disk and said adjacent one of said at least one magnetic disk.

9. The wind turbine arrangement of claim 7, wherein said rolling elements are movably retained between the surface of said at least one coil disk and the surface of said adjacent one of said at least one magnetic disk and roll, slide or move on or against the surface of both of said at least one coil disk and said adjacent one of said at least one magnetic disk.

10. The wind turbine arrangement of claim 9, wherein said rolling elements are thrust bearings including a first ring attached to said at least one coil disk, a second ring attached to said adjacent one of said at least one magnetic disk and a cage assembly that retains rollers between said first and second rings.

11. A wind turbine arrangement, comprising:

an axial flux alternator for generating electricity, said alternator comprising:

at least one coil disk;

magnetic cores with conductive coils arranged on each of said at least one coil disk;

at least one magnetic disk arranged adjacent to said at least one coil disk; and magnets arranged in magnetic rows on each of said at least one magnetic disk;

rolling elements arranged between facing surfaces of said at least one coil disk and said at least one magnetic disk to maintain air gaps between a surface of said magnetic cores on said at least one coil disk and said magnets on said at least one magnetic disk;

said alternator generating electricity from relative rotation between said at least one coil disk and said at least one magnetic disk during which said magnetic cores of said at least one coil disk and said magnets of said at least one magnetic disk are brought into and out of magnetic engagement with one another; and at least one wind turbine, at least one of said coil disk or said magnetic disk being coupled to said at least one wind turbine to cause, when said wind turbine is exposed to wind, a relative rotation between said at least one coil disk and said at least one magnetic disk;

wherein a number of said coils on said at least one coil disk and a number of said magnetic rows on said at least one magnetic disk are set to provide an odd number of phases equal to or larger than three, with the number of said magnetic rows on said at least one magnetic disk divided by the number of said coils in each phase on said at least one coil disk being an even number larger than the number of phases.

12. The wind turbine arrangement of claim 11, wherein said coils are grouped together by electromagnetic conditions such that each group of coil is exposed to the same electromagnetic conditions and provides a respective one of the phases.

13. The wind turbine arrangement of claim 12, wherein said groups of coils are electrically connected in serial connection, in parallel connection or in a combination of serial and parallel connections.

14. The wind turbine arrangement of claim 12, wherein said groups of coils are electrically connected in a polygon type electrical connection.

15. The wind turbine arrangement of claim 14, wherein said groups of coils are arranged such that output of the polygon type electrical connection is input to a multiphase rectifier to provide a high voltage direct current output.

16. The wind turbine arrangement of claim 12, wherein said groups of coils are electrically connected through a multiphase rectifier to provide a high voltage direct current output.

17. The wind turbine arrangement of claim 12, with each magnetic row is separated from adjacent magnetic rows by a constant angular distance.

18. A wind turbine arrangement, comprising:

an axial flux alternator for generating electricity, said alternator comprising:

at least one coil disk;

magnetic cores with conductive coils arranged on each of said at least one coil disk;

at least two magnetic disks arranged such that two of said magnetic disks are adjacent to and on opposite sides of each of said at least one coil disk; and magnets arranged in magnetic rows on each of said two magnetic disks;

rolling elements arranged between facing surfaces of said at least one coil disk and said at least one magnetic disk to maintain air gaps between a surface of said magnetic cores on said at least one coil disk and said magnets on said two magnetic disks;

said alternator generating electricity from relative rotation between said at least one coil disk and said two magnetic disks during which said magnetic cores of said at least one coil disk and said magnets of said two magnetic disks are brought into and out of magnetic engagement with one another; and at least one wind turbine, at least one of said coil disk or said two magnetic disks being coupled to said at least one wind turbine to cause, when said wind turbine is exposed to wind, a relative rotation between said at least one coil disk and said two magnetic disks;

wherein said magnets are arranged on said two magnetic disks such that polarity of the magnetic rows changes every adjacent magnetic row.

19. The wind turbine arrangement of claim 18, further comprising magnetic steel bases that mount said magnets in pairs on said magnetic disks, said magnets in each pair being in different magnetic rows and having opposite outward polarity.

20. The wind turbine arrangement of claim 18, with each magnetic row is separated from adjacent magnetic rows by a constant angular distance.

* * * * *